(12) United States Patent
Hata

(10) Patent No.: US 6,411,779 B1
(45) Date of Patent: Jun. 25, 2002

(54) LENS-FITTED PHOTO FILM UNIT HAVING IC

(75) Inventor: Yukitsugu Hata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 2 days.

(21) Appl. No.: 09/596,048

(22) Filed: Jun. 16, 2000

Related U.S. Application Data

(62) Division of application No. 09/062,734, filed on Apr. 20, 1998, now Pat. No. 6,091,898.

(30) Foreign Application Priority Data

| Apr. 21, 1997 | (JP) | 9-103175 |
| Jul. 28, 1997 | (JP) | 9-201387 |
| Aug. 26, 1997 | (JP) | 9-229343 |

(51) Int. Cl.[7] ................................. G03B 7/26
(52) U.S. Cl. ................. 396/6; 396/205; 396/321
(58) Field of Search ..................... 396/6, 155, 205, 396/206, 310–321

(56) References Cited

U.S. PATENT DOCUMENTS

| 4,156,565 A | * | 5/1979 | Harrison |  |
| 4,332,445 A | * | 6/1982 | Hosono | 396/206 |
| 4,443,077 A | * | 4/1984 | Tanikawa |  |
| 5,349,401 A | * | 9/1994 | Bryant | 396/321 |
| 5,761,541 A | * | 6/1998 | Constable et al. | 396/206 |
| 5,819,126 A | * | 10/1998 | Kitagawa et al. |  |

FOREIGN PATENT DOCUMENTS

| JP | 54-26721 | * | 2/1979 |
| JP | 2-217829 | * | 8/1990 |
| JP | 7-122389 | * | 5/1995 |

* cited by examiner

*Primary Examiner*—David M. Gray
(74) *Attorney, Agent, or Firm*—Young & Thompson

(57) ABSTRACT

A lens-fitted photo film unit includes a photo film housing. A photo film roll chamber is formed in the photo film housing and pre-loaded with photo film in a roll form. A cassette holder chamber incorporates a photo film cassette, to wind the photo film therein after being exposed. A flash-emission main capacitor stores charge by a charging operation. A flash discharge tube emits flash light by a discharging operation of the charge. A flash circuit controls the main capacitor and the flash discharge tube for effecting the charging operation and the discharging operation. An EEPROM is incorporated in the photo film cassette. A write control IC is incorporated in the photo film housing, for writing information to EEPROM. A battery supplies the flash circuit and the write control IC with power. A charge control signal generator or BUSY terminal is disposed in the write control IC, and supplies the flash circuit with a low-level inhibit signal, to inhibit the flash circuit from effecting the charging operation. The write control IC controls the charge control signal generator, to write the information while the flash circuit is inhibited from effecting the charging operation. A power source voltage of the battery is prevented from dropping while the information is written.

7 Claims, 15 Drawing Sheets

START OF CHARGING

LENS-FITTED PHOTO FILM UNIT HAVING IC

CROSS-REFERENCE TO RELATED APPLICATIONS

This application is a division of application Ser. No. 09/062,734, filed Apr. 20, 1998, now U.S. Pat. No. 6,091,898.

BACKGROUND OF THE INVENTION

1. Field of the Invention

The present invention relates to a lens-fitted photo film unit having an IC (integrated circuit). More particularly, the present invention relates to a lens-fitted photo film unit in which information of various kinds is written to a memory IC incorporated therein.

2. Description Related to the Prior Art

A lens-fitted photo film unit is pre-loaded with unexposed photo film, and includes a mechanism disposed in a photo film housing for taking an exposures. A flash built-in type of lens-fitted photo film unit includes a flash device constituted by a flash discharge tube, a flash circuit or charger circuit, and a dry battery. This type is convenient for use in taking exposures with flash light, mainly for scenes at night, indoors, or in the dark.

There are systems suggested in U.S. Pat. No. 4,443,077 (corresponding to JP-A 56-154720) and JP-A 2-217829 in which a memory IC or semiconductor memory is incorporated in a photo film cassette or cartridge, and in which exposure-taking information obtained by a camera upon an exposure is written to the memory IC to be used in a photo laboratory or by users.

Examples of exposure-taking information are exposure data, print format data, date data and caption data. The exposure data represents information of a shutter speed, an aperture stop, and existence of emission of flash light. The print format data represents any of printing aspect ratios of a standard size, a panoramic size and an L-size. If the camera has a structure suggested by JP-A 54-26721 for designating a trimming range, the print format data may represents the trimming range. The date data represents a date of taking an exposure. The caption data represents a sequence of letters input by a user of the camera with its pushbuttons or the like for recording a caption or phrase.

The exposure-taking information is read in the course of printing operation in a photo laboratory. For example the exposure data is used in control of exposure in the printing operation. The print format data is used for automatic determination of printing magnification, and a changeover of a negative photo film mask and a paper mask. It is possible to obtain photographic prints with an format or magnification desired by a user even if all exposures are taken at one equal frame format by the camera.

U.S. Ser. No. 08/784,259 (corresponding to JP-A 9-211680) suggests a lens-fitted photo film unit in which a memory IC is incorporated in its photo film housing or a photo film cassette pre-loaded therein. Exposure-taking information is written to the memory IC. A write control IC and the memory IC are supplied with power by a battery associated with a flash device. Upon the finish of taking each exposure, the write control IC writes the exposure-taking information to the memory IC.

If the flash circuit of the flash unit operates while the exposure-taking information is written, a comparatively great current flows in the flash circuit. The voltage of the battery drops in a temporary manner, to cause errors in operation of the write control IC or the memory IC. It is likely that no exposure-taking information is written to the memory IC, or that data different from the correct exposure-taking information is written.

SUMMARY OF THE INVENTION

In view of the foregoing problems, an object of the present invention is to provide a lens-fitted photo film unit in which information of various kinds is written to a built-in memory IC without errors.

Another object of the present invention is to provide a lens-fitted photo film unit in which charging of a main capacitor of a flash device can be stopped with a simply constructed circuit.

Still another object of the present invention is to provide a lens-fitted photo film unit in which a write control circuit for use with a memory IC can be prevented from erroneously operating when a flash device is charged or operated for emitting flash light.

In order to achieve the above and other objects and advantages of this invention, a lens-fitted photo film unit includes a photo film housing, a photo film roll chamber formed in the photo film housing and pre-loaded with photo film in a roll form, and a cassette holder chamber, formed in the photo film housing, for incorporating a photo film cassette, to wind the photo film therein after being exposed, the photo film housing incorporating a flash-emission main capacitor, a flash discharge tube and a flash circuit, the main capacitor storing charge by a charging operation, the flash discharge tube emitting flash light by a discharging operation of the charge, and the flash circuit controlling the main capacitor and the flash discharge tube for effecting the charging operation and the discharging operation. A memory IC is incorporated in the photo film housing or the photo film cassette. A write control IC is incorporated in the photo film housing, for writing information to the memory IC, and for inhibiting the flash circuit from effecting the charging operation at least while the information is written. A battery supplies the flash circuit, the write control IC, and the memory IC with power.

The write control IC writes the information in association with taking of one exposure.

In a preferred embodiment, an information writer is disposed in the write control IC incorporated in the photo film housing, for writing information to the memory IC. A charge control signal generator is disposed in the write control IC, for supplying the flash circuit with an inhibit signal, to inhibit the flash circuit from effecting the charging operation. A controller is disposed in the write control IC, for controlling the information writer and the charge control signal generator, to cause the information writer to operate while the flash circuit is inhibited from effecting the charging operation, whereby a power source voltage of the battery is prevented from dropping while the information is written.

Furthermore a shutter mechanism is incorporated in the photo film housing, for taking an exposure on the photo film. An exposure detector unit detects operation of the shutter mechanism for one time, to generate a detection signal, wherein the controller causes the information writer to operate in response to the detection signal.

The flash circuit includes a charger switch, operable externally, for generating a charging signal. An oscillation transistor is connected with the main capacitor, having a base connected with the charger switch, turned on by the charging signal, for charging the main capacitor, the base of the oscillation transistor being connected further with the charge control signal generator, the oscillation transistor being forcibly turned off by the inhibit signal.

A potential of the charge control signal generator in generation of the inhibit signal is lower than a potential of the charger switch in generation of the charge signal.

Consequently information of various kinds can be written to the built-in memory IC without errors.

In a preferred embodiment, a voltage detector detects a reach of a charged voltage of the main capacitor to a predetermined voltage, to generate a detection signal. The controller causes the charge control signal generator to generate the inhibit signal in accordance with the detection signal.

The voltage detector includes a first circuit connected in parallel with the main capacitor, a detection current occurring to flow in the first circuit in response to application of the predetermined voltage thereto. A switching circuit is turned on in response to the detection current from the first circuit, for generating the detection signal.

Consequently the charging of the main capacitor of the flash device can be stopped with the simply constructed circuit.

In another preferred embodiment, a shutter mechanism is incorporated in the photo film housing, for taking an exposure on the photo film. A trigger switch is disposed in the flash circuit, turned on by the shutter mechanism upon operation of the shutter mechanism, for applying a trigger voltage to the flash discharge tube, to trigger the discharging operation. A signal generator, having a semiconductor switching element, generates detection signal in response to turning on of the trigger switch, wherein the controller responsively causes the information writer to operate.

In still another preferred embodiment, a filter circuit is connected between the battery and the write control IC, for absorbing electric noises created therebetween, to prevent the write control IC from erroneous operation during the charging operation and the discharging operation.

Consequently a write control circuit for use with the memory IC can be prevented from erroneously operating when the flash device is charged or operated for emitting flash light.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
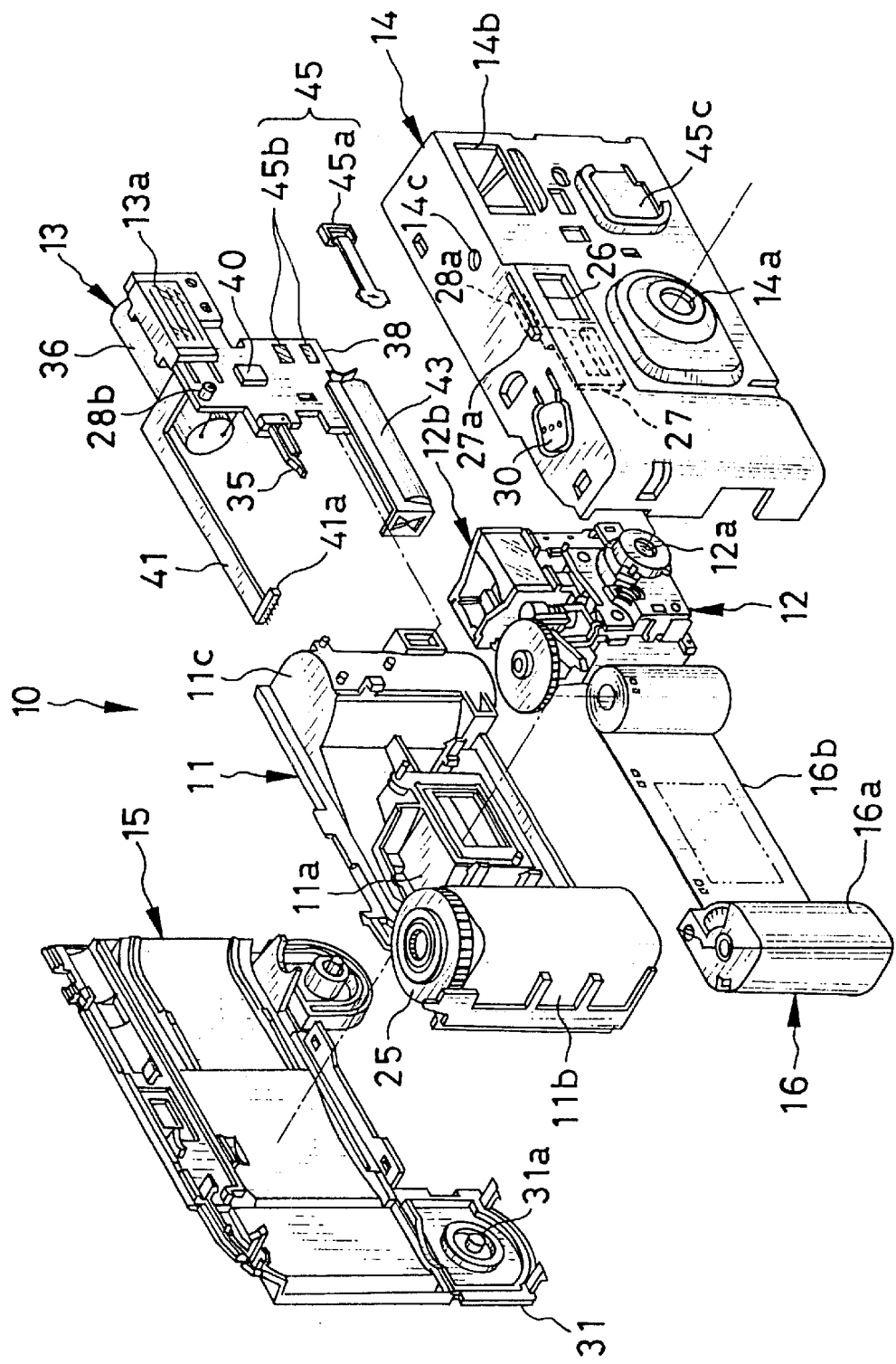
FIG. 1 is an exploded perspective illustrating a lens-fitted photo film unit.
Figure 1A:
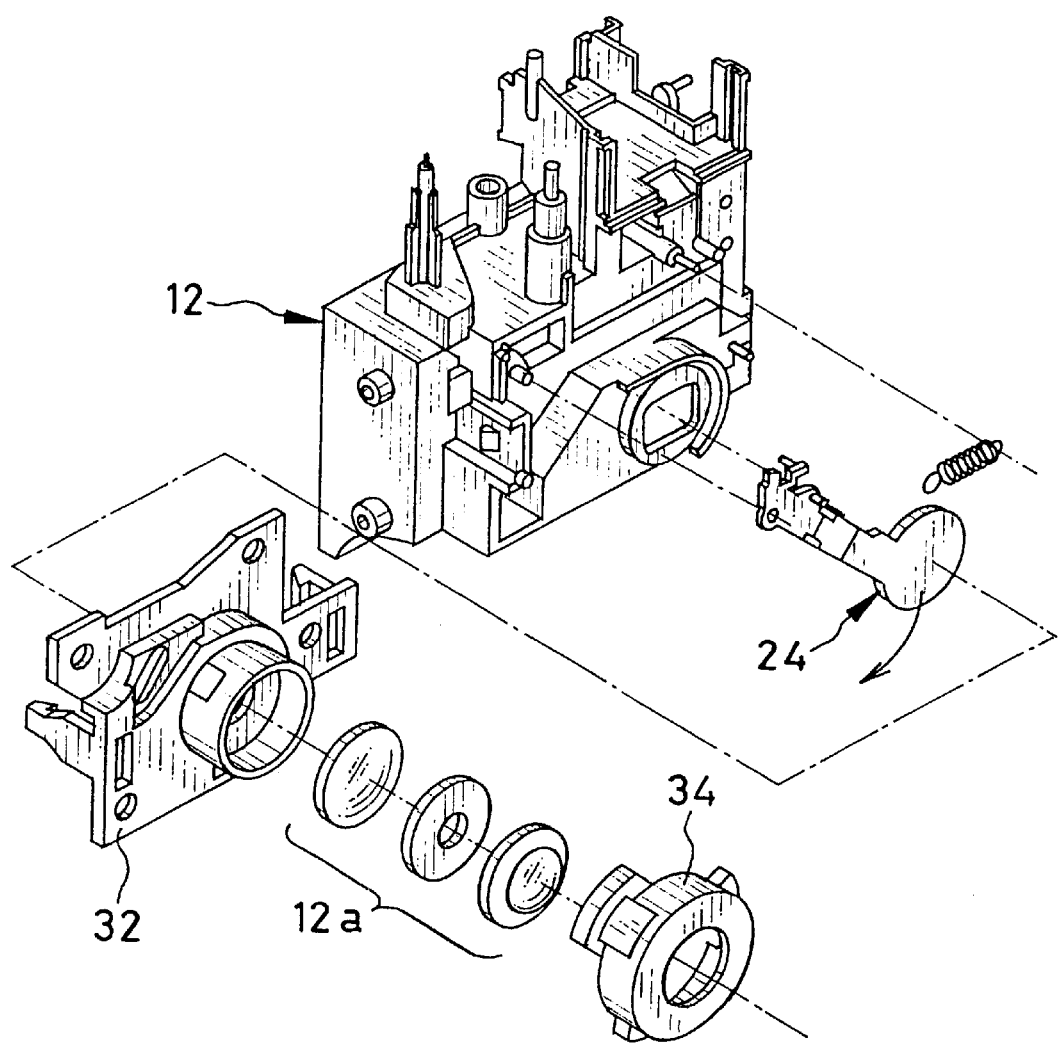

In FIG. 1, a lens-fitted photo film unit consists of a photo film housing 10, which includes a photo film containing unit 11, an exposure-taking unit 12 incorporating a shutter mechanism, an electronic flash unit 13, a front cover 14 and a rear cover 15. The photo film containing unit 11 is pre-loaded with a photo film cassette 16.

Figure 2:
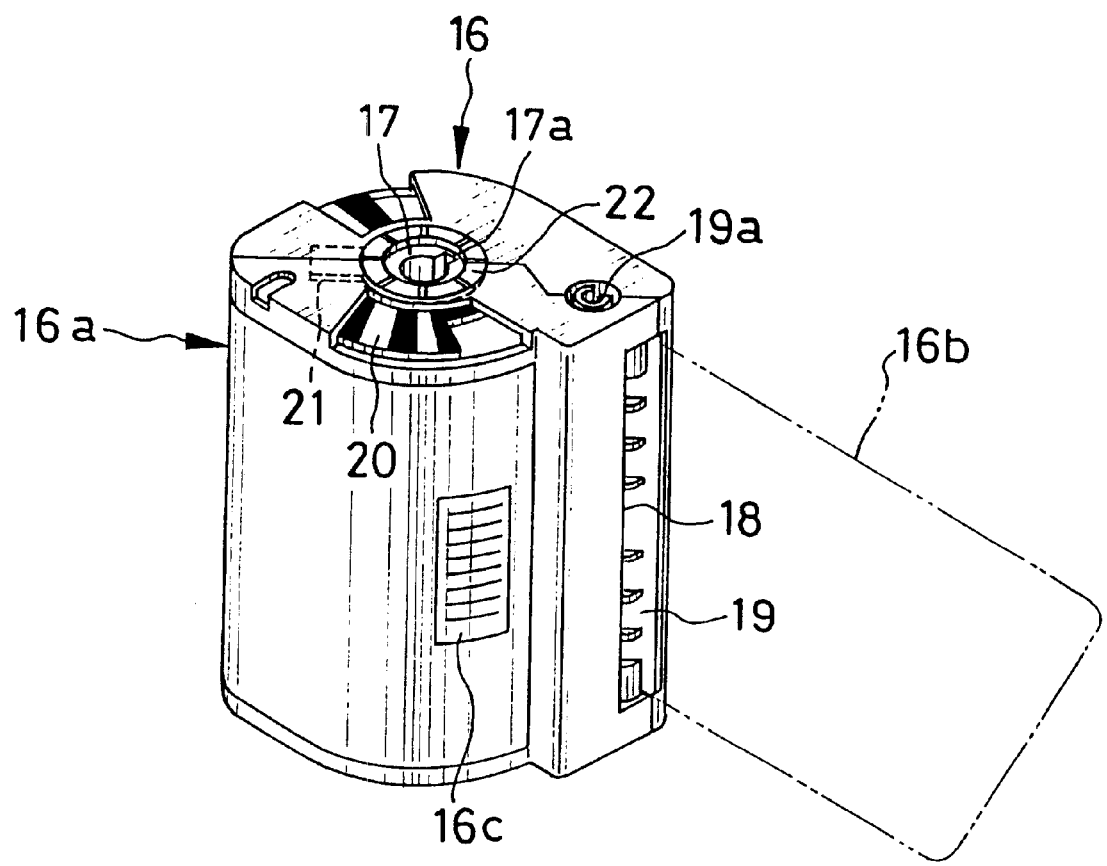
FIG. 2 is a perspective illustrating a photo film cassette.

In FIG. 2, an outer appearance of the photo film cassette 16 is depicted. The photo film cassette 16 is an IX 240 type according to the Advanced Photo System (trade name). A cassette shell 16a rotatably contains a spool 17 about which a roll of photo film 16b is wound. Axial ends of the spool 17 are exposed through end faces of the cassette shell 16a, and respectively have a key way 17a. A photo film passageway 18 is formed in the cassette shell 16a, where the photo film 16b is advanced through it. A cassette shutter 19 is incorporated in the photo film passageway 18 in an openable manner. Axial ends of the cassette shutter 19 appears through the end faces of the cassette shell 16a, and respectively have a key way 19a.

The cassette shell 16a incorporates a photo film advancing mechanism. While the cassette shutter 19 is kept open by retaining one of the key way 19a, the spool 17 is rotated in the clockwise direction to advance a leader of the photo film 16b through the photo film passageway 18 to the outside. The photo film 16b includes a transparent magnetic recording layer disposed on the entirety of a back surface which is reverse to an emulsion surface. The magnetic recording layer is used for storing information, including exposure-taking information or laboratory information identifying laboratory information for the purpose of the printing process. The information is written by a recorder device incorporated in a camera or a photographic printer. It is possible for manufacturers of lens-fitted photo film units to record types of the photo film or identification numbers of the photo film.

A bar code label or sticker 16c is attached to the cassette shell 16a, and indicates an identification number of the cassette shell 16a, to associate the cassette shell 16a with the photo film 16b individually. The identification number of the photo film 16b is photographically prerecorded in a form of bar codes on the photo film 16b in a manufacturing process by a side printing method. It is also possible to record the same information on a magnetic recording layer of the photo film 16b magnetically. A reference numeral 20 designates a disk having a bar code, which represents information of a type of the photo film 16b and its maximum number of available frames. The disk 20 rotates together with the spool 17, and is read for its bar code information by a bar code reader disposed in a camera or a photographic printer. Note that it is possible omit the disk 20, because the photo film cassette has a memory IC or EEPROM 21 for storing information.

To write the exposure-taking information to the magnetic recording layer of the photo film 16b, it is necessary that a camera or a lens-fitted photo film unit should incorporate a magnetic recorder including a magnetic head and a drive circuit for driving the magnetic head. However the magnetic recorder has a complicated structure to increase a manufacturing cost of a camera considerably. It is impossible to incorporate such an expensive magnetic recorder of the prior art in a low-cost camera or single-use lens-fitted photo film unit which is pre-loaded with photo film and which, after being used, is withdrawn by each manufacturer. The "Advanced Photo System" (trade name) cannot be fully utilized in such products of low cost.

The cassette shell 16a of the photo film cassette 16 has EEPROM 21 for recording exposure-taking information and other information. The exposure-taking information in EEPROM 21 is read in a photo laboratory, and recorded to the magnetic recording layer of the photo film 16b in turn, or used as exposure compensation data for use in the photographic printing operation, so as to utilize characteristics of the Advance Photo System (trade name). Note that an information writer device in a camera for recording data to EEPROM 21 is relatively inexpensive in comparison with a magnetic recorder. It is possible to incorporate such an information writer device in a low-cost camera or lens-fitted photo film unit.

EEPROM 21 (electrically erasable programmable read-only memory) does not require a power source for keeping storage of information. In EEPROM 21, information can be written and erased electrically. EEPROM 21 is electrically connected with contact points 22 by means of a wire bonding method known in the art. The contact points 22 are exposed about an end of the spool 17.

The photo film cassette 16 is not only used in a lens-fitted photo film unit but also shipped for use with a camera. After products of the photo film cassette 16 are transferred to a manufacturing line of lens-fitted photo film units, various kinds of basic information are written at predetermined addresses in EEPROM 21, including designation information, manufacturing date information, initializing time information, identification number information and the like. The initializing time information represents a time of starting measurement of cumulative time measured by a write control IC 40.

In FIG. 1, the photo film containing unit 11 includes a cassette holder chamber 11b and a photo film roll chamber 11c between which a light-shielding tunnel 11a is located. The cassette holder chamber 11b is loaded with the cassette shell 16a of the photo film cassette 16. The photo film roll chamber 11c is loaded with a photo film roll of the photo film 16b previously drawn from the cassette shell 16a.

The exposure-taking unit 12 contains a shutter charge mechanism, a one-frame advance mechanism, a counter stepping mechanism, a shutter drive mechanism, a shutter blade 24, a taking lens 12a, and a viewfinder 12b constituted by an objective lens and an eyepiece lens. The exposure-taking unit 12 is fitted on the front of the light-shielding tunnel 11a. Those are the same as such incorporated in a conventional lens-fitted photo film unit.

A winder dial or wheel 25 is disposed on the top of the cassette holder chamber 11b. A drive shaft is formed with a bottom face of the winder wheel 25, and is engaged with the key way 17a of the spool 17 of the photo film cassette 16. When the winder wheel 25 is rotated in the counterclockwise direction, rotation of the spool 17 winds an exposed portion of the photo film 16b into the cassette shell 16a.

The front cover 14 covers the front of the photo film containing unit 11. The front cover 14 has openings 14a and 14b and an objective window 26. The openings 14a and 14b are formed to expose the taking lens 12a and a flash emitter window 13a. The objective window 26 is formed to define an observable range of the viewfinder 12b. An aspect ratio of the objective window 26 is 9/16, and equal to that of HDTV (high-definition television). Of course frames created on the cassette shell 16a will have the same aspect ratio.

A mask plate 27 is disposed on the rear of the objective window 26 in a slidable manner. The mask plate 27 has a pushbutton 27a, which is slid to move the mask plate 27 toward and away from the rear of the objective window 26, and set in one of a panoramic position and a standard position. The mask plate 27, when set in the panoramic position, limits a field of view of the objective window 26 to a panoramic region with an aspect ratio of 1:2.8, and when set in the standard position, defines a standard region inside the objective window 26 itself.

The rear surface of the mask plate 27 has a high reflection plate 28a. A photo sensor 28b is disposed on the flash unit 13, and combined with the high reflection plate 28a to constitute a mode sensor 28 of FIG. 3. The high reflection plate 28a of the mode sensor 28, when the mask plate 27 is in a panoramic position, is confronted with the photo sensor 28b to output a MODE signal of the High (H) level, and when the mask plate 27 is in a position for the standard size, is moves away from the front of the photo sensor 28b to output the MODE signal of the Low (L) level. According to the MODE signal, it is checked in which of the standard position and the panoramic position the mask plate 27 has been set in the course of taking an exposure.

Note that, if there is another changeover mechanism for changing the field of view instead of the mask plate 27, additional limited regions different from the standard and panoramic regions may be set, such as an L-size region and a telescopic region. The L-size region is defined in accordance with an aspect ratio of an L-size print. The telescopic region is defined with a considerably reduced width. Also it is possible to use various methods in discerning the regions of view, such as an electrically detecting method in addition to the above-described photoelectrically detecting method.

A top of the front cover 14 has a shutter release button 30. When the shutter release button 30 is depressed upon the finish of the shutter charging, the shutter mechanism in the exposure-taking unit 12 is actuated to take an exposure. The rear cover 15 covers the rear and the bottom of the photo film containing unit 11 in a light-tight manner. A bottom lid 31 covering the bottom of the cassette holder chamber 11b has a boss 31a, which supports a bottom end of the spool 17, so that the cassette shell 16a is retained in a shell-float manner.

The flash unit 13 is constituted by the flash emitter window 13a, a flash circuit 37, an information writer device 42 and a battery 43. See FIG. 3. The flash circuit 37 includes a trigger switch 35 and a main capacitor 36 for flash emission. The trigger switch 35 is included in an exposure detector unit. The information writer device 42 includes the photo sensor 28b, the write control IC 40 and a flexible connector plate 41 for the purpose of reading information from, and writing information to, EEPROM 21 incorporated in the cassette shell 16a. The battery 43 is a common power source supplying the flash circuit 37 and the information writer device 42 with power, is UM-3 type, and has a voltage V1 of 1.5 volts.

A charger switch 45 is constituted by a metal segment 45a and a contact pattern 45b. The metal segment 45a is disposed on the right end of the photo film containing unit 11. The contact pattern 45b has a pair of contact points, and is included in a printed circuit board 38. When a push-button 45c of the front cover 14 is depressed, the metal segment 45a contacts the contact pattern 45b to turn on. The trigger switch 35 is constituted by a pair of segments arranged vertically, and turned on when they contact each other at the time that the shutter blade 24 opens fully.

A plug 41a is disposed on an end of the connector plate 41, and is constituted by a train of connecting pins. The plug 41a is connected with connector terminals (not shown) disposed on the top of the cassette holder chamber 11b. The connector terminals are electrically connected with connector pins disposed inside the contact points 22. The connector pins are connected with the contact points 22 of the cassette shell 16a. Finally the write control IC 40 is connected with EEPROM 21.

Figure 3:
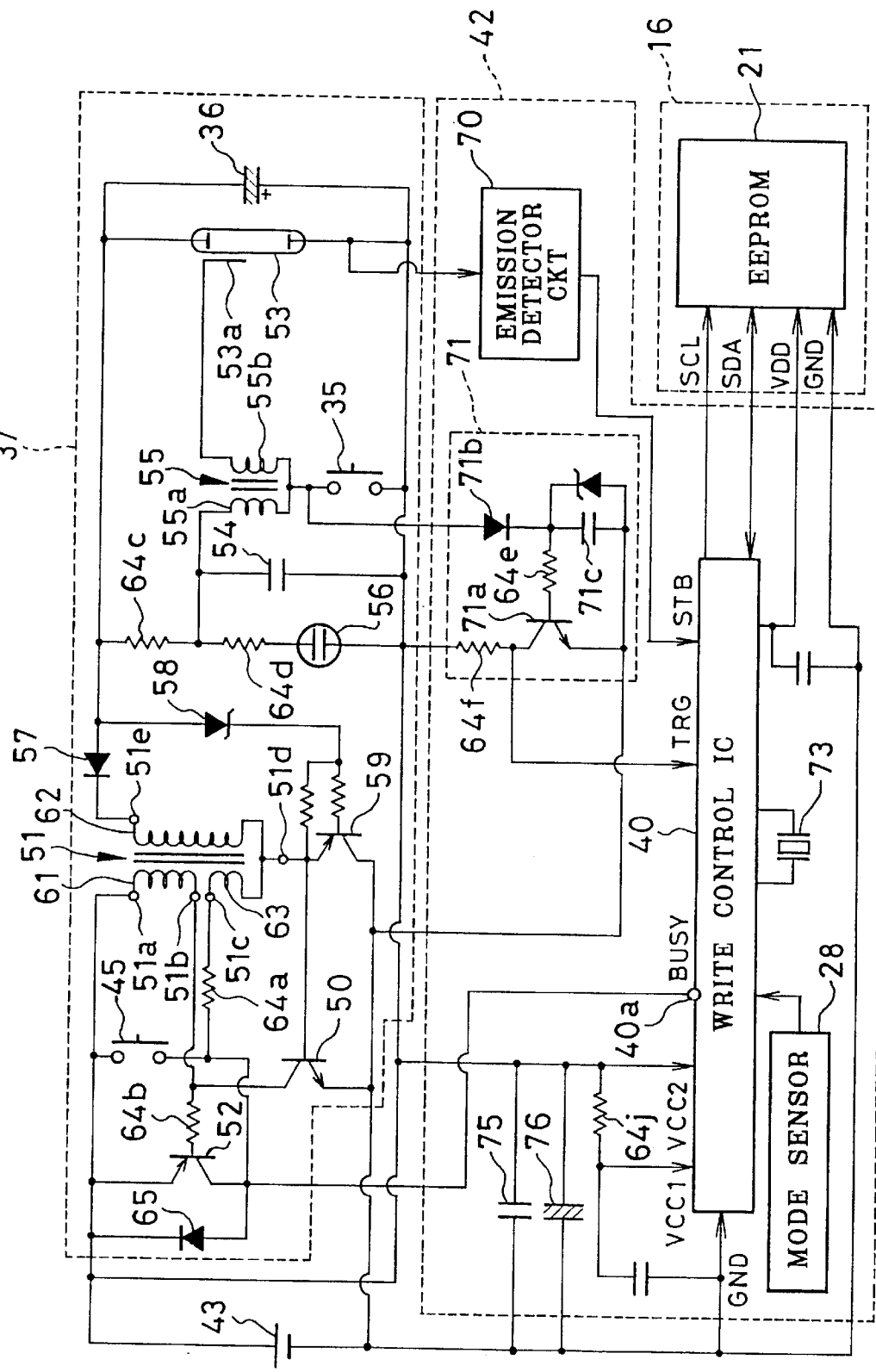
FIG. 3 is a block diagram schematically illustrating electrical circuits of the lens-fitted photo film unit.

In FIG. 3, electrical arrangement of the lens-fitted photo film unit is depicted. The flash circuit 37 includes the trigger switch 35, the main capacitor 36, the charger switch 45 and also an oscillation transistor 50 which is an n-p-n transistor, an oscillation transformer 51, a latch transistor 52 which is a p-n-p transistor, a flash discharge tube or xenon tube 53, a trigger capacitor 54, a trigger transformer 55 as a booster, a neon tube 56, a charger diode 57, a Zener diode 58 and a stop transistor 59 which is an p-n-p transistor.

The oscillation transformer 51 is constituted by a primary winding 61, a secondary winding 62 and a tertiary winding 63, which are combined together in a manner of mutual-inductance coupling. The primary winding 61 has a first terminal 51a and a second terminal 51b. The secondary winding 62 has a fourth terminal 51d and a fifth terminal 51e. The tertiary winding 63 has the fourth terminal 51d common to the secondary winding 62, and also has a third terminal 51c.

The first terminal 51a of the oscillation transformer 51 is connected with a positive electrode of the battery 43. The second terminal 51b is connected with a collector of the oscillation transistor 50. The third terminal 51c is connected with a positive electrode of the battery 43 via a resistor 64a and the charger switch 45. The fourth terminal 51d is connected with a base of the oscillation transistor 50. The fifth terminal 51e is connected with a negative electrode of the main capacitor 36 via the charger diode 57. The charger diode 57 has such a direction that its cathode is on the fifth terminal 51e. The emitter of the oscillation transistor 50 is connected with a negative electrode of the battery 43, and grounded.

The oscillation transistor 50 and the oscillation transformer 51 connected therewith constitute a blocking oscillator circuit, which converts a low voltage of the battery 43 to a high voltage, to charge the main capacitor 36 with the high voltage. The oscillation transistor 50, when the charger switch 45 is turned on, is supplied with a charging signal. In other words the battery 43 supplies the oscillation transistor 50 with a base current via the resistor 64a and the tertiary winding 63, to turn on the oscillation transistor 50. A collector current is caused to flow in the primary winding 61 as a current of the primary side. The base current of the oscillation transistor 50 increases according to the positive feedback from the oscillation transformer 51, so that the oscillation transistor 50 oscillates while the collector current is increased.

The latch transistor 52 causes the oscillation of the oscillation transistor 50 to continue by supplying the base of the oscillation transistor 50 with a feedback current even after the charger switch 45 is turned off. The emitter of the latch transistor 52 is connected with the positive electrode of the battery 43. The base of the latch transistor 52 is connected with the collector of the oscillation transistor 50 via a resistor 64b. The collector of the latch transistor 52 is connected with the base of the oscillation transistor 50 via the resistor 64a and the tertiary winding 63. Once the oscillation transistor 50 starts operating, the latch transistor 52 is turned on. Even when the charger switch 45 is turned off, the collector current of the latch transistor 52 flows to the base of the oscillation transistor 50 as feedback current. The oscillation transistor 50 is caused to continue oscillation by the positive feedback of the latch transistor 52.

If the BUSY signal from the write control IC 40 becomes the High (H) level even if the charger switch 45 is turned off, the oscillation transistor 50 is supplied with the BUSY signal which is a charging signal. Then the oscillation transistor 50 is turned on, and is caused to keep oscillating by the positive feedback of the latch transistor 52. Details on this will be described later.

A looping diode 65 is so connected that its anode is connected with the third terminal 51c of the tertiary winding 63 via the resistor 64a, and its cathode is connected with the positive electrode of the battery 43. A current loop is formed with the looping diode 65 in consideration of back electromotive force in the tertiary winding 63 generated when the charger switch 45 is turned off, for the purpose of eliminating instability in the oscillation of the blocking oscillator circuit or avoiding an excessive length in the charging time.

Electromotive force occurs in the secondary winding 62 at a high voltage according to a ratio between the numbers of the turns of the windings 61 and 62, for example 300 volts. When this electromotive force occurs, the charger diode 57 supplies the main capacitor 36 with a secondary-side current flowing from the fifth terminal 51e to the fourth terminal 51d.

Electrodes of the main capacitor 36 are respectively connected with electrodes of the flash discharge tube 53. The positive electrode of the main capacitor 36 is connected with the positive electrode of the battery 43. The negative electrode of the main capacitor 36 is connected with the anode of the charger diode 57. The main capacitor 36 is charged in such a manner that a potential of the negative electrode of the main capacitor 36 is lowered with reference to a positive potential of the battery 43. In the present embodiment, the normal charged voltage Va across the main capacitor 36 is predetermined as 300 volts. It is possible to induce discharge in the flash discharge tube 53 at an intended designed light amount when the charged voltage Vc is the normal charged voltage Va.

One electrode of the trigger capacitor 54 is connected with an anode of the charger diode 57 via a resistor 64c. The other electrode of the trigger capacitor 54 is connected with a positive electrode of the battery 43. The trigger capacitor 54 is charged by the secondary-side current at the same time as the main capacitor 36 is charged. The trigger transformer 55 includes a primary winding 55a and a secondary winding 55b. One terminal of the primary winding 55a is connected with one electrode of the trigger capacitor 54. The other terminal of the primary winding 55a is also a second terminal of the secondary winding 55b, and is connected with a positive electrode of the battery 43 via the trigger switch 35. A first terminal of the secondary winding 55b of the trigger transformer 55 is connected with a trigger electrode 53a, which is disposed close to the flash discharge tube 53.

The trigger capacitor 54 is discharged when the trigger switch 35 is turned on in response to operation of the shutter. A current upon the discharging operation flows through the primary winding 55a of the trigger transformer 55. A trigger voltage as high as 4 kV occurs at the secondary winding 55b, and is applied to the flash discharge tube 53 via the trigger electrode 53a. The trigger voltage ionizes the xenon gas in the flash discharge tube 53, to break down resistance between the electrodes of the flash discharge tube 53, so that the charge having been stored in the main capacitor 36 is passed through the flash discharge tube 53. The flash discharge tube 53 induces discharge and emanates flash light.

One electrode of the neon tube 56 is connected with a negative electrode of the main capacitor 36 via a resistor 64d and the resistor 64c. The other electrode of the neon tube 56 is connected with a positive electrode of the main capacitor 36. When a charged voltage of the main capacitor 36 comes up to a predetermined voltage Vb, the neon tube 56 is turned on. Upon turning on of the neon tube 56, the trigger capacitor 54 is discharged by passing the charge through the neon tube 56. Voltage across the neon tube 56 is abruptly decreases until the neon tube 56 is turned off.

However the charging operation continues while the oscillation transistor 50 operates. As the main capacitor 36 is connected with the trigger capacitor 54, the charged voltage across the trigger capacitor 54 increases, again to turn on the neon tube 56. The neon tube 56 starts blinking shortly before the main capacitor 36 comes to have the normal charged voltage. A blinking period at which the neon tube 56 is turned on and off becomes shorter in the course of the increase in the charged voltage across the main capacitor 36.

The neon tube 56 is disposed in a position of an indicator window 14c formed in the top face of the front cover 14. See FIG. 1. A user visually checks an illuminating state of the neon tube 56 through the indicator window 14c, and is informed of a standby condition for flash emission. Although the voltage Vb should be equal to the normal charged voltage Va, the voltage Vb in the present embodiment is slightly lower than the normal charged voltage Va, for example approximately 265 volts. Consequently the user takes an exposure with flash after a blinking period of the neon tube 56 becomes sufficiently small.

The Zener diode 58 and the stop transistor 59 are combined for stopping the charging operation of the flash circuit 37 when the main capacitor 36 is charged up to the normal charged voltage Va. The Zener diode 58 is constructed with a Zener voltage of 300 volts in consideration of the main capacitor 36 of which the normal charged voltage is 300 volts. The anode of the Zener diode 58 is connected with the negative electrode of the main capacitor 36. The cathode of the Zener diode 58 is connected with the base of the stop transistor 59. The emitter and collector of the stop transistor 59 are respectively connected with the base and emitter of the oscillation transistor 50.

When the main capacitor 36 is charged up to the normal charged voltage Va, the charged voltage is applied to the Zener diode 58. A Zener current or reverse current flows through the Zener diode 58, to turn on the stop transistor 59. Upon turning on of the stop transistor 59, the base and the emitter of the oscillation transistor 50 are short-circuited, so that the oscillation transistor 50 is stopped. The latch transistor 52 is also turned off. The oscillation of the blocking oscillator circuit is stopped to stop charging the main capacitor 36.

Note that, instead of using the Zener diode 58 and the stop transistor 59 to stop charging, it is possible detect a reach of the charged voltage of the main capacitor 36 to the normal charged voltage Va according to a change in a potential at a certain point in the flash circuit 37 or a change in a period of the oscillation, in order to stop charging by setting a BUSY signal at the Low (L) level. The BUSY signal is described later in detail.

The information writer device 42 is constituted by the write control IC 40, the mode sensor 28 and also an emission detector circuit 70, a trigger detector circuit 71 and a quartz oscillator element 73. The trigger detector circuit 71 is included in the exposure detector unit.

The emission detector circuit 70 detects a current flowing upon the discharge of the main capacitor 36 at the flash discharge tube 53, and generates a flash signal STB representing existence of the flash emission. The flash signal STB is at the High (H) level for a predetermined time after the flash emission upon effecting the flash emission.

The trigger detector circuit 71 principally consists of a trigger detector transistor 71a and a diode 71b. The trigger detector transistor 71a is an n-p-n transistor as a semiconductor switching element. The diode 71b is connected for the purpose of avoiding breaking the trigger detector transistor 71a upon application of reverse voltage thereto. An anode of the diode 71b connected with a terminal of the trigger switch 35 on the side of the trigger transformer 55. A cathode of the diode 71b is connected with a base of the trigger detector transistor 71a via a resistor 64e. A collector of the trigger detector transistor 71a is connected with a positive electrode of the battery 43 via a resistor 64f. An emitter of the trigger detector transistor 71a is connected with a positive electrode of the battery 43. The trigger detector transistor 71a outputs a trigger detection signal TRG as a potential of its collector.

The trigger detector transistor 71a, when the trigger switch 35 is turned off, does not have a base current, and is turned off. No current flows between its emitter and collector. A potential of the collector is the positive potential of the battery 43. A trigger detection signal changes to the High (H) level or 1.5 volts. When the trigger switch 35 is turned on, a base current flows to the trigger detector transistor 71a, which is turned on to allow a current to flow between the emitter and the collector. The potential of the collector decreases to set the trigger detection signal at the Low (L) level or zero volt. There is a capacitor 71c, which is connected for the purpose of preventing electrical noise from causing errors in the operation of the trigger detector transistor 71a.

A VCC1 terminal of the write control IC 40 is supplied with a drive voltage V2 of approximately one (1) volt by the battery 43 via a resistor 64j. A VCC2 terminal of the write control IC 40 is directly supplied with the voltage V1 of the battery 43. The drive voltage V2 applied to the VCC1 terminal keeps the write control IC 40 in an active state, to effect controls of writing data to EEPROM 21. The voltage V1 applied to the VCC2 terminal is boosted by a voltage doubler circuit 85 to a drive voltage VDD of 3 volts adapted to EEPROM 21. The voltage doubler circuit 85 is included in the write control IC 40. See FIG. 4. The write control IC 40 applies the drive voltage VDD to EEPROM 21.

Also there are capacitors 75 and 76 connected with power source lines from positive and negative sides of the battery 43 near to the write control IC 40, for absorbing electrical noises on the power source lines to stabilizing operation of the write control IC 40.

Figure 4:
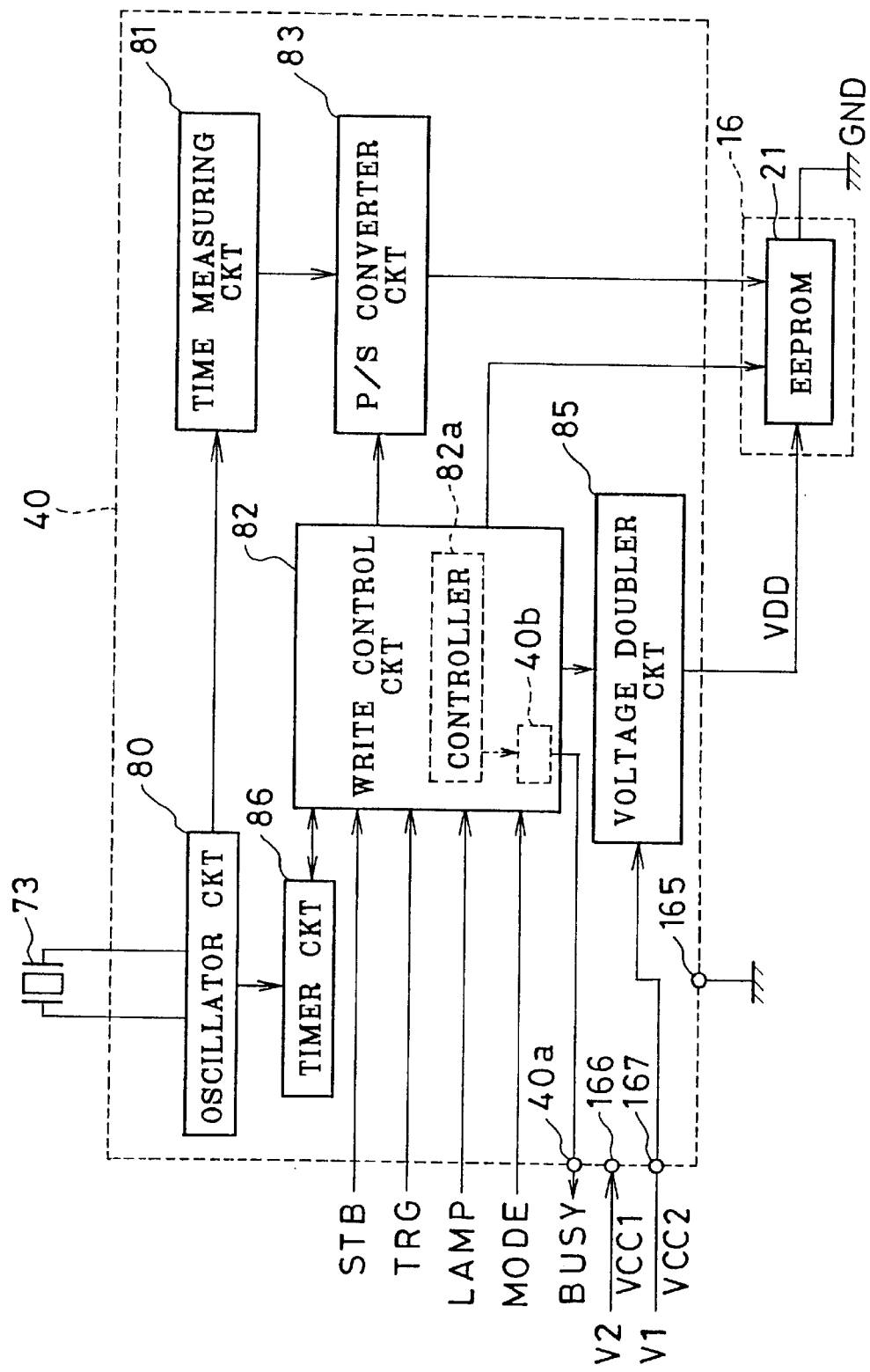
FIG. 4 is a block diagram schematically illustrating a structure of a write control IC with an EEPROM.

In FIG. 4, construction of the write control IC 40 is schematically depicted. The write control IC 40 is a single small chip of an integrated circuit, and includes an oscillator circuit 80, a cumulative time measuring circuit 81 for cumulative measurement of time, a write control circuit 82, a parallel/serial (P/S) converter circuit 83 and the voltage doubler circuit 85. The write control IC 40 is constructed to be operated normally at least with 0.8 volt as voltage V1 from the battery 43, in consideration of drop in the voltage of the battery 43 in the course of the charging. The write control IC 40 also includes circuits (not shown) for writing fundamental information to EEPROM 21 of the photo film cassette 16 in the photo film housing 10, or for initializing the cumulative time measuring circuit 81 in connection with an external computer.

The oscillator circuit 80 generates a clock signal at a regular period by use of the quartz oscillator element 73. According to the clock from the oscillator circuit 80, the cumulative time measuring circuit 81 measures cumulative time starting upon the measurement start time point, which is stored in EEPROM 21. The cumulative time is sent to the P/S converter circuit 83 as cumulative time information.

The write control circuit 82 is sequentially operated in accordance with clock generated by the oscillator circuit 80. The write control circuit 82 receives a mode signal, a flash signal and a trigger detection signal respectively from the mode sensor 28, the emission detector circuit 70 and the trigger detector circuit 71. Upon receipt of the trigger detection signal, the write control circuit 82 produces designation information, including the view region information for the viewfinder and information of use of flash, on the basis of the mode signal and the flash signal. The write control circuit 82 sends the designation information to the P/S converter circuit 83.

The P/S converter circuit 83 is controlled by the write control circuit 82, and converts exposure-taking information into serial data (SDA). The exposure-taking information includes the cumulative time information determined upon occurrence of the trigger detection signal, and the designation information from the write control circuit 82. The serial data (SDA) is sent to EEPROM 21 in synchronism with the synchronizing clock (SCL) from the write control circuit 82, to write the exposure-taking information to EEPROM 21.

While the exposure-taking information is written to EEPROM 21, the flash circuit 37 as blocking oscillator circuit charges the main capacitor 36. A great current flowing through the flash circuit 37 drops the voltage of the battery 43. The drive voltage VDD applied to EEPROM 21 is dropped. It is likely that no exposure-taking information is written to EEPROM 21, or that the information in an erroneous form is written to it. In order to avoid such errors, there is a busy terminal 40a or charge control signal generator 40b, disposed on the write control IC 40, for inhibiting the flash circuit 37 from charging while the write control IC 40 writes information to EEPROM 21. The states of the charge control signal generator 40b are controlled by a controller 82a of the write control circuit 82.

The busy terminal 40a of the charge control signal generator 40b is a three-state terminal or tri-state terminal, which outputs a BUSY signal at a High (H) or Low (L) level in a state of low input impedance, and also has a selective state of high input impedance. The charge control signal generator 40b is connected with a base of the oscillation transistor 50 via the resistor 64a and the tertiary winding 63. In other words the charge control signal generator 40b is connected with the latch transistor 52 which is connected with the base of the oscillation transistor 50.

Note that the high-input-impedance state of the busy terminal 40a is such that no current flows into or out of the busy terminal 40a.

After detection of the trigger detection signal, the write control circuit 82 sets the busy terminal 40a of the charge control signal generator 40b in the inhibition state, and sets the BUSY signal of the charge control signal generator 40b at the Low (L) level, so that a base current is inhibited from flowing to the oscillation transistor 50. The flash circuit 37 is inhibited from charging. During the inhibition, exposure-taking information is written to EEPROM 21. Upon the finish of writing the exposure-taking information, the charge control signal generator 40b is set in a charge start state for a predetermined time, to send the BUSY signal at the High (H) level. The oscillation transistor 50 is supplied with the BUSY signal at the High (H) level as a charging signal, to start charging the main capacitor 36. Then the busy terminal 40a is set in the high-input-impedance state. While the busy terminal 40a is in the high-input-impedance state, the oscillation transistor 50 is allowed to operate.

Figure 5:
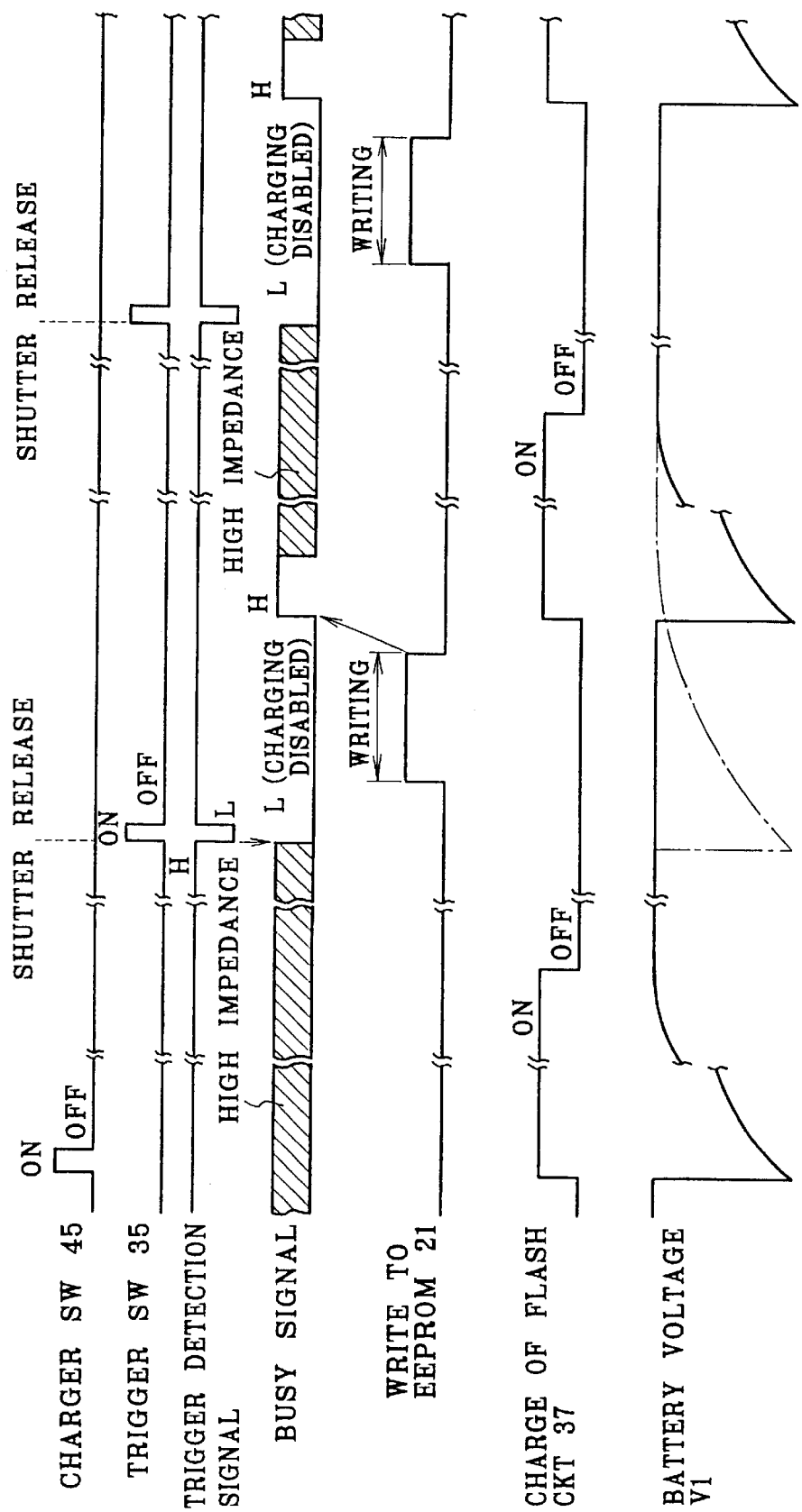
FIG. 5 is a timing chart illustrating operation of a flash circuit and the write control IC.

The operation of the above embodiment is described now with reference to FIG. 5. In taking an exposure, a user pushes the pushbutton 27a to set the mask plate 27 in either of the standard and panoramic positions in accordance with an aspect ratio of a photographic print which he or she desires. If he or she desires a photograph with flash for the first time, he or she depresses the pushbutton 45c to turn on the charger switch 45. Immediately after this, the user is allowed to stop depressing the pushbutton 45c to turn off the charger switch 45. Then the pushbutton 27a is operated to change the mask plate 27 to the standard or panoramic positions.

When the charger switch 45 is turned on, the busy terminal 40a of the charge control signal generator 40b of the write control IC 40 is in the high-input-impedance state. The battery 43 causes a base current to flow to the oscillation transistor 50 through the charger switch 45, the resistor 64a and the tertiary winding 63. Then the oscillation transistor 50 is turned on, in which a collector current occurs and flows. The collector current flows across the primary winding 61 as a primary-side current in a direction from the first terminal 51a toward the second terminal 51b.

As the primary-side current starts to flow and increases, electromotive force of high voltage is generated in the secondary winding 62. A secondary-side current flows from the fifth terminal 51e to the fourth terminal 51d. The secondary-side current flows to the base of the oscillation transistor 50, so that the collector current or primary-side current from the primary winding 61 increases.

When the collector current flows in the oscillation transistor 50, the base of the latch transistor 52 is supplied with the same current as a base current. The latch transistor 52 is turned on, to supply the oscillation transistor 50 with a base current from the battery 43 via the resistor 64a and the tertiary winding 63.

The positive feedback of the oscillation transformer 51 and the oscillation transistor 50 increases a base current of the oscillation transistor 50, to increase the collector current or the primary-side current. When the oscillation transistor 50 comes near to a saturated state, a change in the collector current decreases. The change in the primary-side current decreases. There occurs back electromotive force in the windings 61–63 of the oscillation transformer 51. The back electromotive force quickly decreases the base current to the oscillation transistor 50 from the oscillation transformer 51. So the collector current decreases quickly.

As the oscillation transistor 50 receives the base current from the latch transistor 52, the oscillation transistor 50 is kept turned on. After generation of the back electromotive force in the oscillation transformer 51 is stopped, the collector current in the oscillation transistor 50 increases to increase the primary-side current. Consequently the oscillation of the oscillation transistor 50 continues even when the charger switch 45 is turned off.

The secondary-side current, which flows from the fifth terminal 51e to the fourth terminal 51d with electromotive force generated in the secondary winding 62 in the oscillation, charges the main capacitor 36 and the trigger capacitor 54 via the charger diode 57. In the course of the charging, the great current flows in the flash circuit 37 to drop the voltage V1 of the battery 43. Immediately after the start of the charging, the voltage V1 becomes approximately 0.8 volt.

In the course of charging of the main capacitor 36, the charged voltage Vc across the main capacitor 36 comes up to the voltage Vb which is approximately 265 volts. Then the neon tube 56 comes to be turned on and off repeatedly, to start a blinking operation. In the further charging of the main capacitor 36, the charged voltage Vc across the main capacitor 36 comes up to the normal charged voltage Va, a Zener current comes to flow through the Zener diode 58 to turn on the stop transistor 59.

When the stop transistor 59 is turned on, the base and emitter of the oscillation transistor 50 are short-circuited. The oscillation of the oscillation transistor 50 is stopped. The latch transistor 52 is turned off. Thus the charging operation of the main capacitor 36 is stopped. As the charger switch 45 and the latch transistor 52 are kept turned off, no Zener current flows in the Zener diode 58. Even if the stop transistor 59 is turned off, the oscillation transistor 50 does not start oscillation. The main capacitor 36, when the charged voltage Vc becomes 300 volts, stops being charged.

Note that, after the main capacitor 36 stops being charged, there is a phenomenon in that the main capacitor 36 is discharged naturally with time if the lens-fitted photo film unit is left to stand for a long time without being used. As a result, the charged voltage Vc decreases. This is likely to be so small that the flash emission will be impossible or will result in too small a light amount. However it is possible for a user again to depress the pushbutton 45c to turn on the charger switch 45. The main capacitor 36 is additionally charged to the normal charged voltage Va.

The decrease in the charged voltage Vc can be observed and recognized by a difference between the states of the neon tube 56 being turned on and off, or by the smallness in the blinking period. Note that the pushbutton 45c may be depressed shortly before an exposure with flash light in a manner irrespective of the decrease in the charged voltage Vc. In considering that the charging can be started by changing the BUSY signal to the High (H) level, each time when a predetermined time lapses after the stop of the charging, for example five (5) minutes, the BUSY signal may be changed to the High (H) level by the write control IC 40, to charge the main capacitor 36 additionally for the purpose of compensating for natural discharge with time. This predetermined time or interval to effect the additional charging should be set in consideration of a state near to, but short of, an impossible state for flash emission. Also an external operable inhibit switch may be added to inhibit this automatic additional charging temporarily for the purpose of saving electric power without waste.

The blinking operation of the trigger capacitor 54 at a small period causes the user to know the finished state of standby for the flash emission. He or she depresses the shutter release button 30 to take an exposure. The shutter blade 24 of the shutter mechanism is actuated to expose the photo film 16b. At the same time as the shutter blade 24 opens fully, the trigger switch 35 is turned on in a manner irrespective of existence of the flash emission.

When the trigger switch 35 is turned on with the main capacitor 36 charged, the trigger capacitor 54 is discharged to apply the trigger voltage from the trigger transformer 55 to the flash discharge tube 53. The main capacitor 36 is discharged to pass the charge through the flash discharge tube 53 to emanate flash. Upon the flash emission, the emission detector circuit 70 keeps the flash signal at the High (H) level for a predetermined time. If the charged voltage Vc of the main capacitor 36 is equal to or smaller than that enough for the flash emission, no flash is emitted. The flash signal remains the Low (L) level.

When the trigger switch 35 is turned on, the trigger detector transistor 71a is turned on to set the trigger detection signal at the Low (L) level. Immediately upon the flash emission, the oscillation transistor 50 receives a pulse through a line in the flash circuit 37 at the instant of discharge of the flash discharge tube 53 due to the charge stored in the main capacitor 36. The pulse is likely to turn on the oscillation transistor 50 so that the flash circuit 37 start charging the main capacitor 36 in the manner similar to the above. It is likely that the voltage V1 of the battery 43 is considerably lowered as indicated in the phantom lines in FIG. 5, for example comes down to 0.8 volt.

When the trigger detection signal changes to the Low (L) level, the write control circuit 82 changes the BUSY signal to the Low (L) level. If an electric pulse is sent to the oscillation transistor 50 upon the flash emission, the oscillation transistor 50 is not turned on, because its base is kept at the Low (L) level through the resistor 64a and the tertiary winding 63. Accordingly there is no charging operation started in the flash circuit 37. After the oscillation transistor 50 is initially turned on, the BUSY signal of the Low (L) level hinders the oscillation transistor 50 from being supplied with a feedback current from the latch transistor 52. The base of the oscillation transistor 50 becoming the Low (L) level, the oscillation transistor 50 immediately stops operation.

With the BUSY signal set at the Low (L) level, the flash circuit 37 is inhibited from charging the main capacitor 36. The write control circuit 82 causes the voltage doubler circuit 85 to have an active state. The voltage doubler circuit 85 boosts the voltage V1 from the battery 43 to the drive voltage VDD, with which EEPROM 21 starts being supplied.

The write control circuit 82 checks existence of the flash emission according to a signal level of the flash signal. The photo sensor 28b of the mode sensor 28 is operated to check the position of the mask plate 27 according to a signal level of the mode signal. The write control circuit 82 latches designation information representing a combination of existence of the flash emission and the position of the mask plate 27. In the latching operation, the designation information is latched in a short time after the generation of the trigger detection signal.

The write control circuit 82 also controls the P/S converter circuit 83, and sets cumulative time information of the cumulative time measuring circuit 81 to the P/S converter circuit 83. After this, the write control circuit 82 sends out the synchronizing clock. The cumulative time information is set in synchronism with the synchronizing clock. The P/S converter circuit 83 converts the cumulative time information into serial data, and sends the data to EEPROM 21.

When the P/S converter circuit 83 finishes sending the cumulative time information, the write control circuit 82 sets in the P/S converter circuit 83 the designation information being latched, and sends the synchronizing clock again. The serial data of the designation information from the P/S converter circuit 83 is sent to EEPROM 21. The exposure-taking information, which includes the cumulative time information and designation information, is written to a predetermined address in EEPROM 21.

While exposure-taking information is written to EEPROM 21, the flash circuit 37 is not in the course of charging the main capacitor. The voltage V1 being 1.5 volts of the battery 43, which does not have a drop of the voltage, is boosted by the voltage doubler circuit 85 to the drive voltage VDD as predetermined, and supplied for EEPROM 21. EEPROM 21 operates normally, to which the exposure-taking information from the write control IC 40 is written correctly. Of course the BUSY signal remains the Low (L) level. The oscillation transistor 50 remains turned off even when the charger switch 45 is turned on while the information is written. Consequently the exposure-taking information is written without failure.

Upon the finish of writing the exposure-taking information to EEPROM 21, the controller 82a changes the BUSY signal of the busy terminal 40a of the charge control signal generator 40b from the Low (L) level to the High (H) level. The BUSY signal of the High (H) level is sent to the oscillation transistor 50 as a charging signal. The oscillation transistor 50 is turned on to start charging the main capacitor 36 in a manner similar to turning on of the charger switch 45. The BUSY signal is kept at the High (H) level for a predetermined period, and then changed to the high-input-impedance state.

Similarly exposures are taken one after another. Each time after one exposure is taken, exposure-taking information is written to EEPROM 21. While the exposure-taking information is written, the BUSY signal is kept at the Low (L) level which inhibits the flash circuit 37 from the charging the main capacitor.

Figure 6:
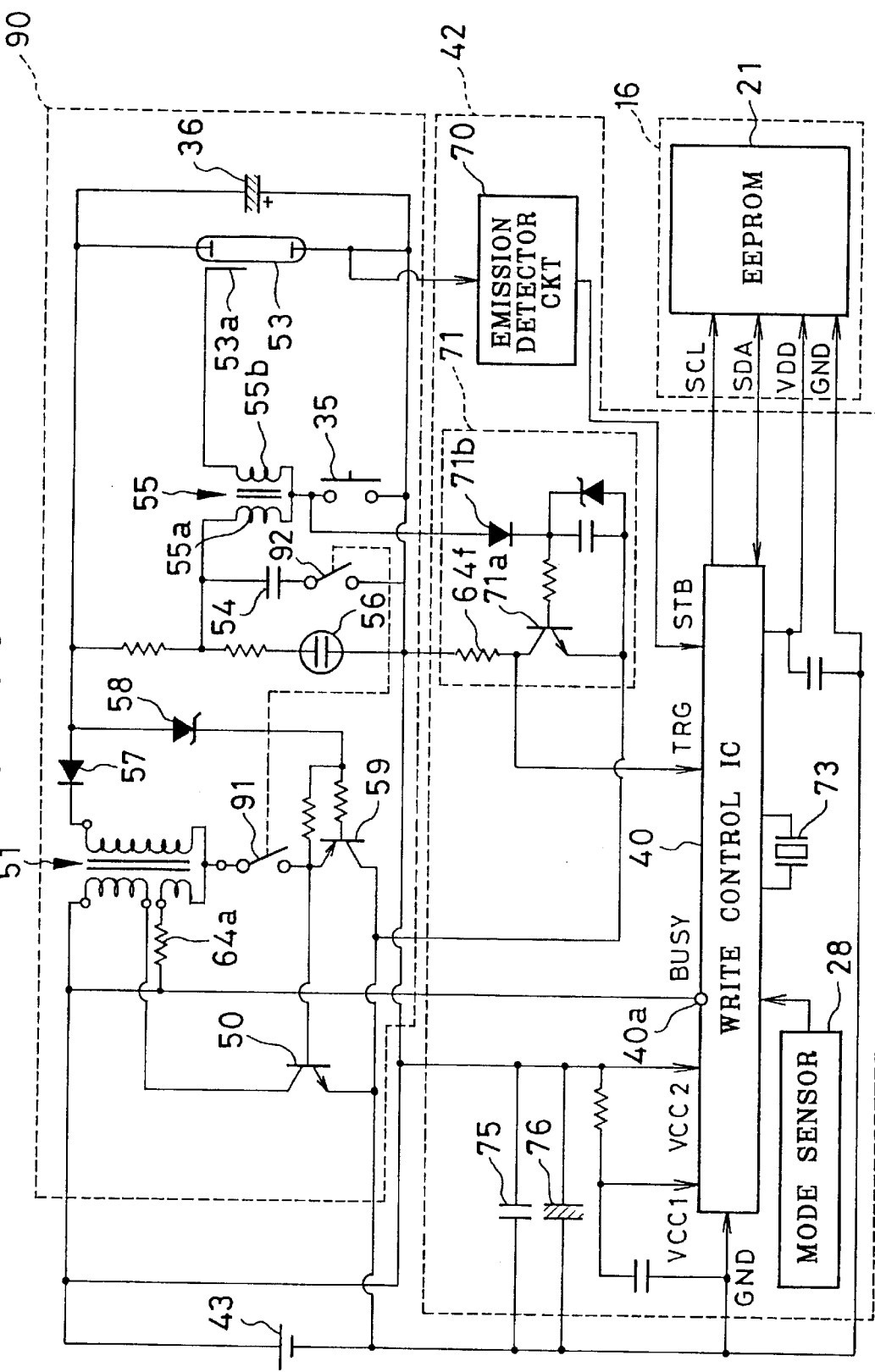
FIG. 6 is a block diagram schematically illustrating other preferred electrical circuits in which one transistor is omitted in a blocking oscillator and a switch is added for a flash emission.
Figure 7:
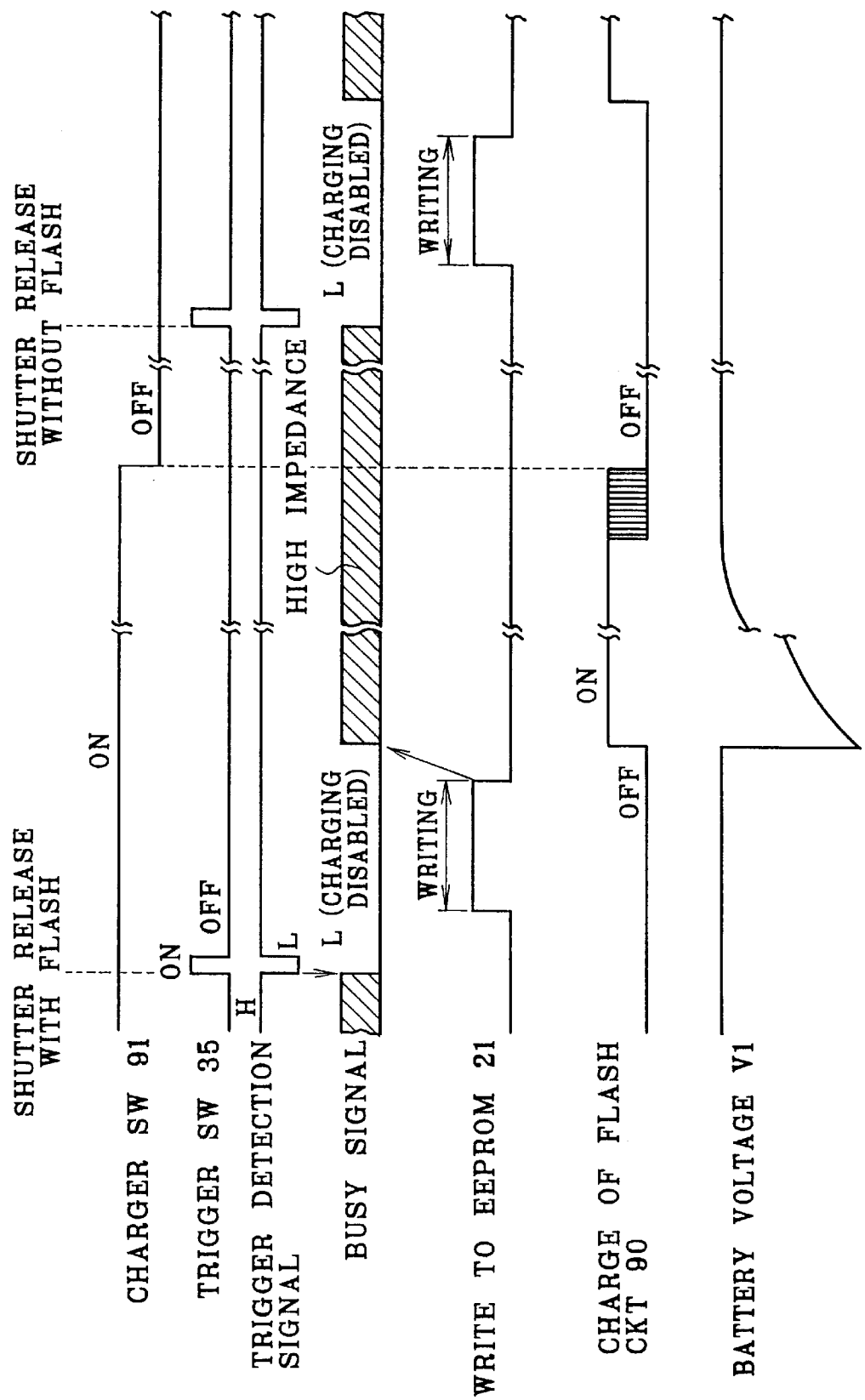
FIG. 7 is a timing chart illustrating operation of the circuits of FIG. 6.

In FIGS. 6 and 7, another preferred embodiment is depicted, in which a flash circuit has a slidable charger switch operable in sliding movement between positions of being turned on and off. In FIG. 6, an electronic flash circuit 90 includes a slidable charger switch 91 and a switch 92. The switch 92 is mechanically linked with the slidable charger switch 91, and operated to select existence or lack of the flash light to be emitted. The flash circuit 90 is the same as the flash circuit 37 of FIG. 3, but does not have the latch transistor 52, the looping diode 65 and the resistor 64b of the flash circuit 37. Elements similar to those of the above embodiment are designated with identical reference numerals.

The switch 92 is connected in parallel with the trigger capacitor 54. The switch 92, when the slidable charger switch 91 is turned on, is turned on, and when the slidable charger switch 91 is turned off, is turned off. If the slidable charger switch 91 is turned off, the trigger capacitor 54 is not discharged irrespective of turning on of the trigger switch 35. There is no flash emission even if the main capacitor 36 is charged. For taking an exposure with flash, the slidable charger switch 91 is kept turned on.

When the trigger detection signal is generated as depicted in FIG. 7, the BUSY signal is changed to the Low (L) level to inhibit the flash circuit 90 from charging the main capacitor 36, before the exposure-taking information is written to EEPROM 21. Even if the slidable charger switch 91 is turned on immediately upon an exposure with flash or while the exposure-taking information is written, the main capacitor 36 is not charged during the writing of the exposure-taking information. Consequently the exposure-taking information can be correctly written to EEPROM 21.

For the use of the flash circuit 90, the busy terminal 40a of the charge control signal generator 40b is set in the state of high impedance after the information is written. If the slidable charger switch 91 is turned on, the charging is started after the information is written. If the slidable charger switch 91 is turned off, no charging is started. With the charge control signal generator 40b set in the state of high impedance, turning on of the slidable charger switch 91 causes the flash circuit 90 to repeat the charging operation and stop of the charging after the main capacitor 36 is charged to the normal charged voltage Va. The main capacitor 36, therefore, can be kept charged with the normal charged voltage Va. Note that a pushable type of switch may be used instead of the slidable type. The pushable type may be depressed one time for turning on, and depressed two times for turning off.

Figure 8:
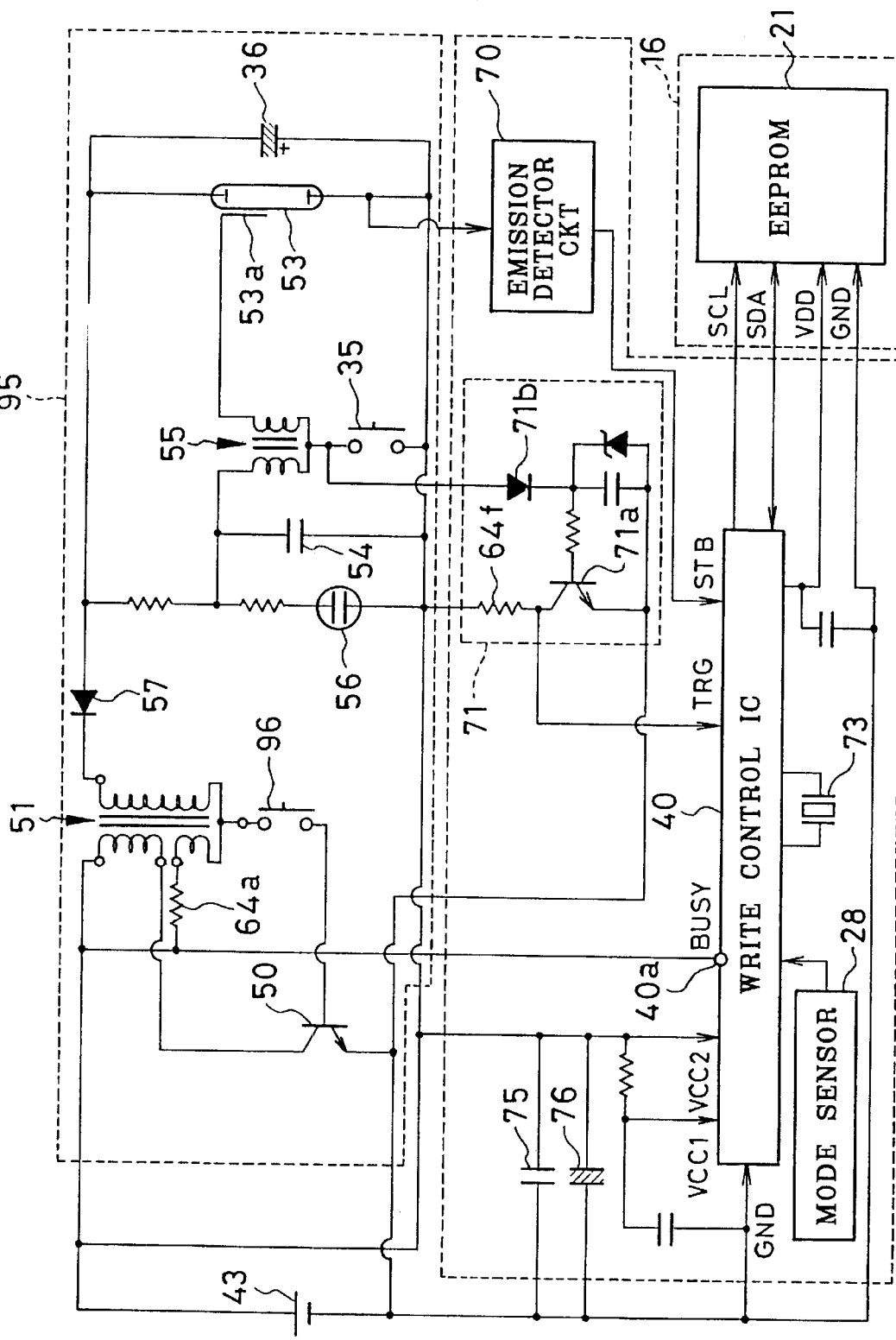
FIG. 8 is a block diagram schematically illustrating still other preferred electrical circuits without the switch, but in which a charger switch must be kept turned on before charging is finished with the oscillator.

In FIG. 8, still another preferred embodiment is depicted, having a flash circuit 95 in which the main capacitor 36 is charged only while a charger switch 96 is turned on. Elements similar to those of the embodiment of FIG. 3 are designated with identical reference numerals. The BUSY signal in the flash circuit 95 is kept at the Low (L) level while the exposure-taking information is written. The main capacitor 36 is not charged even if the charger switch 96 is turned on while the information is written. Thus the exposure-taking information can be correctly written to EEPROM 21. Note that the busy terminal 40a after the writing operation is set in the high-input-impedance state in a manner similar to the embodiment of FIG. 6.

In the above embodiments, the memory IC is incorporated in the photo film cassette. Alternatively a memory IC can be incorporated in a photo film housing, for example in a printed circuit board of the flash circuit. Also a memory IC can be incorporated in combination with the write control IC.

In the above embodiments, the BUSY signal is set at the Low (L) level shortly before writing the exposure-taking information to the memory IC, to inhibit the flash circuit from charging. In response to the finish of the writing of the information, the BUSY signal is set at the High (H) level, to allow the flash circuit to charge. Alternatively elapsed time can be measured after occurrence of the trigger detection signal or after the start of writing the exposure-taking information. The clock from the oscillator circuit may be utilized. Upon the lapse of a predetermined time, the charging can be allowed. The exposure-taking information, which is written each time after one exposure, has an equal and unchanged size, and only requires equal duration of time to be written. It is possible by use of time to control the BUSY signal or the state of the BUSY terminal.

In the above embodiments, the BUSY signal at the Low (L) level is set to the High (H) level or the high-input-impedance state immediately upon the finish of writing the information. Of course a short time may be predetermined and measured upon the finish of the writing, and used for setting the BUSY signal to the High (H) level or the high-input-impedance state.

Another preferred embodiment is described now, in which charging of a main capacitor can be stopped with a simply constructed circuit.

Figure 14:
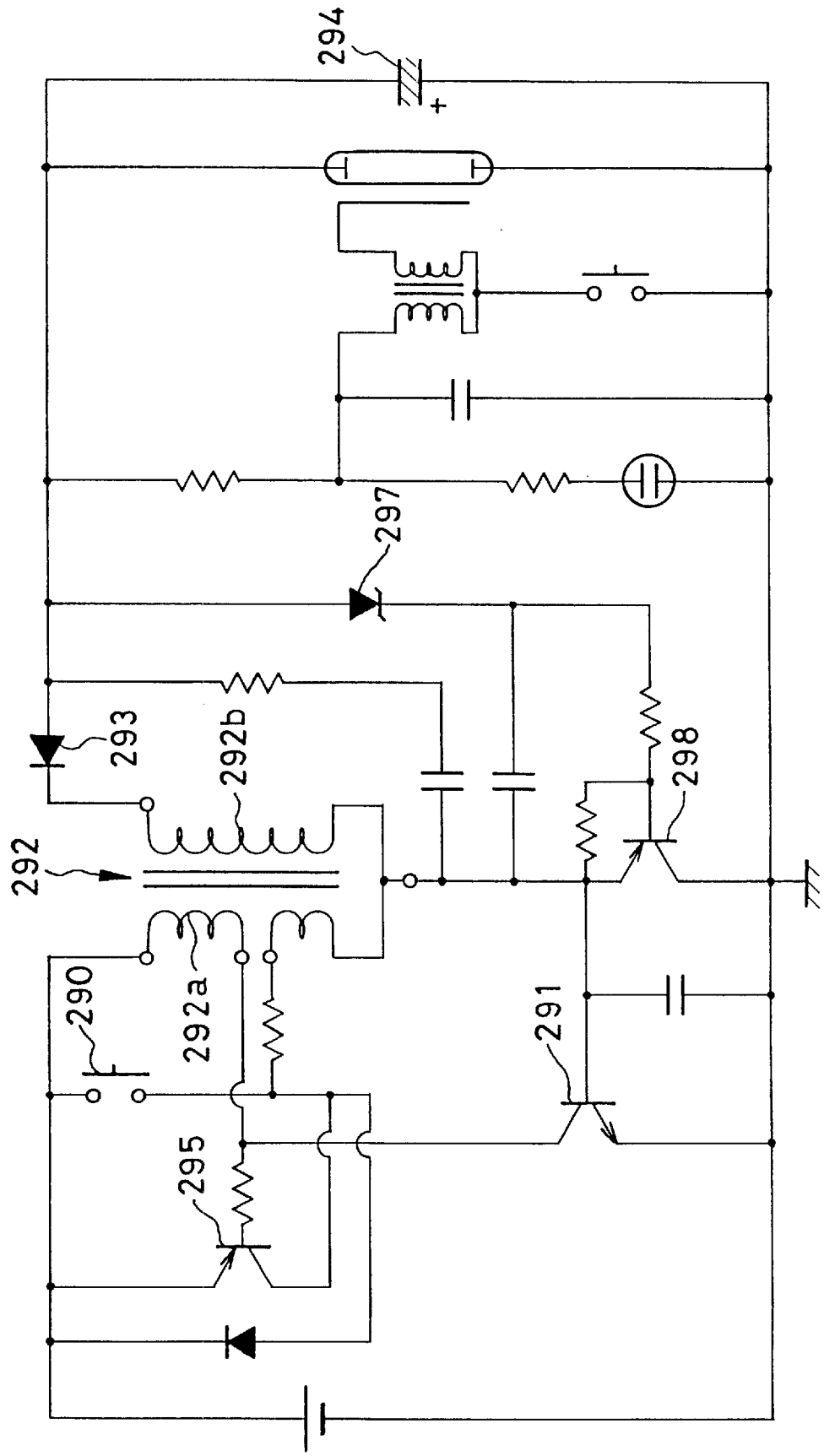
FIG. 14 is a block diagram schematically illustrating electrical circuits of a lens-fitted photo film unit of the prior art.

In FIG. 14, an auto-stop type of a flash circuit of the prior art is depicted, which is essentially similar to that suggested in JP-A 7-122389. Once a charger switch 290 is turned on, charging is continued even if the charger switch 290 is turned off shortly after being turned on. Upon turning on of the charger switch 290, an oscillation transistor 291 starts operation. The oscillation transistor 291 oscillates by means of positive feedback of an oscillation transformer 292, to increase the primary-side current in a primary winding 292a, namely a collector current in the oscillation transistor 291. In the course of the increase of the primary-side current, electromotive force occurs in a secondary winding 292b to cause a secondary-side current to flow, which charges a main capacitor 294 via a diode 293.

The collector current flows in the oscillation transistor 291, to turn on a latch transistor 295. A change on the primary-side current decreases, so that back electromotive force occurs in the secondary winding 292b. A base current with which the base of the oscillation transistor 291 is supplied by the oscillation transformer 292 is decreased. However the base of the oscillation transistor 291 is supplied with a base current by the latch transistor 295 being turned on, so that the oscillation transistor 291 remains turned on. Again the primary-side current starts flowing to continue the oscillation. The main capacitor 294 continues being charged.

A Zener diode 297 is a type having a Zener voltage of 300 volts, which is determined in consideration of a normal charged voltage of the main capacitor 294 being 300 volts. When the main capacitor 294 is charged to the normal charged voltage, this voltage is applied to the Zener diode 297 to cause a Zener current to flow. Upon the reach of the voltage across the main capacitor 294 to the normal charged voltage, a stop transistor 298 is supplied with a base current and is turned on, to connect the emitter of the oscillation transistor 291 to its base. As a result the oscillation transistor 291 is turned off, to turn off the latch transistor 295. The oscillation of the oscillation transistor 291 is stopped to stop charging the main capacitor 294.

The charged voltage of the main capacitor 294 is applied to the Zener diode 297. When the main capacitor 294 comes to have the normal charged voltage, the Zener current is caused to flow to operate the stop transistor 298. It is necessary to use the Zener diode 297 of which the Zener voltage is high consistently with the normal charged voltage. However the Zener diode 297 with a high Zener voltage is considerably expensive, to raise the cost of the entirety of the flash circuit.

Figure 9:
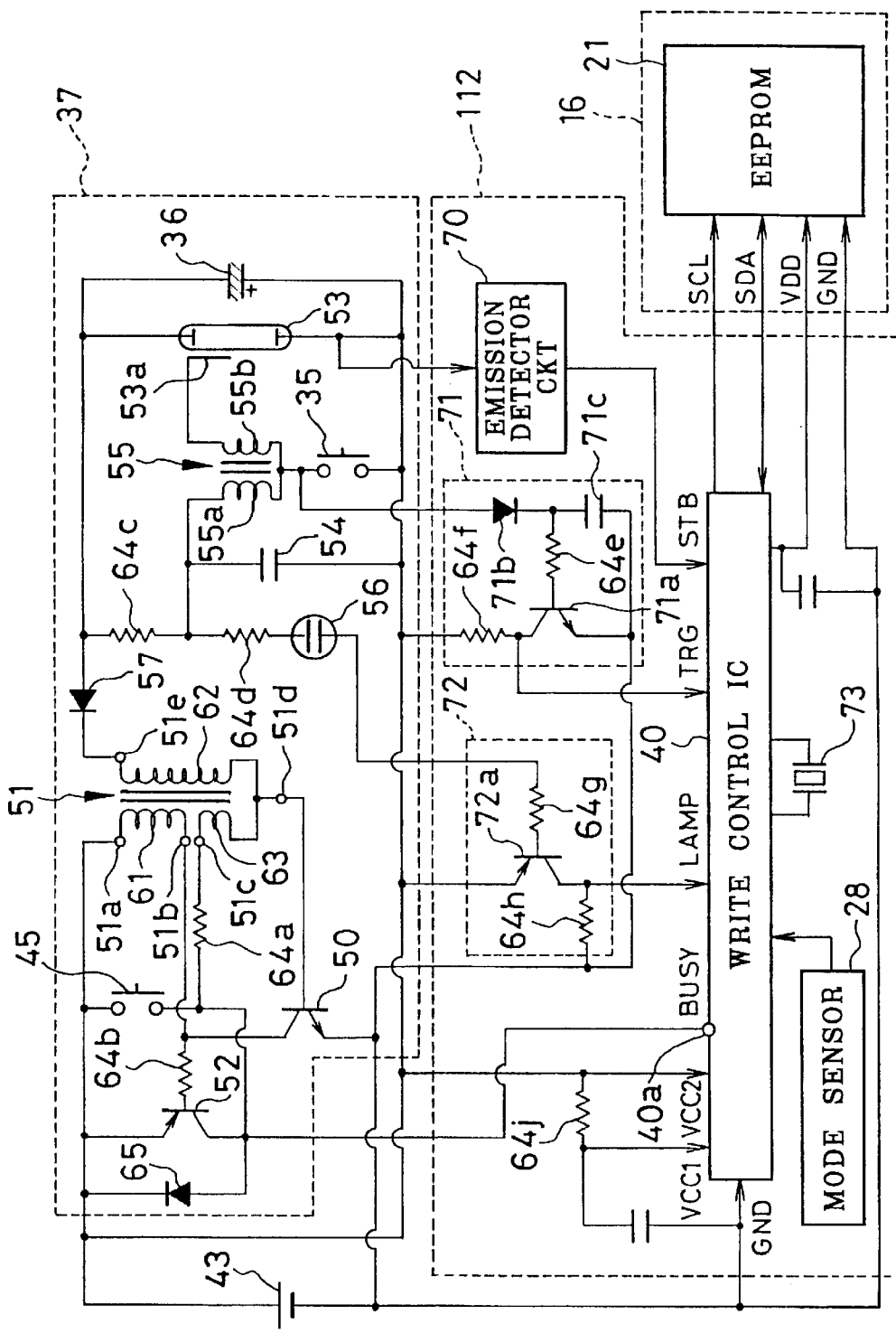
FIG. 9 is a block diagram schematically illustrating other preferred electrical circuits in which a predetermined charged voltage can be detected by a detector.
Figure 10:
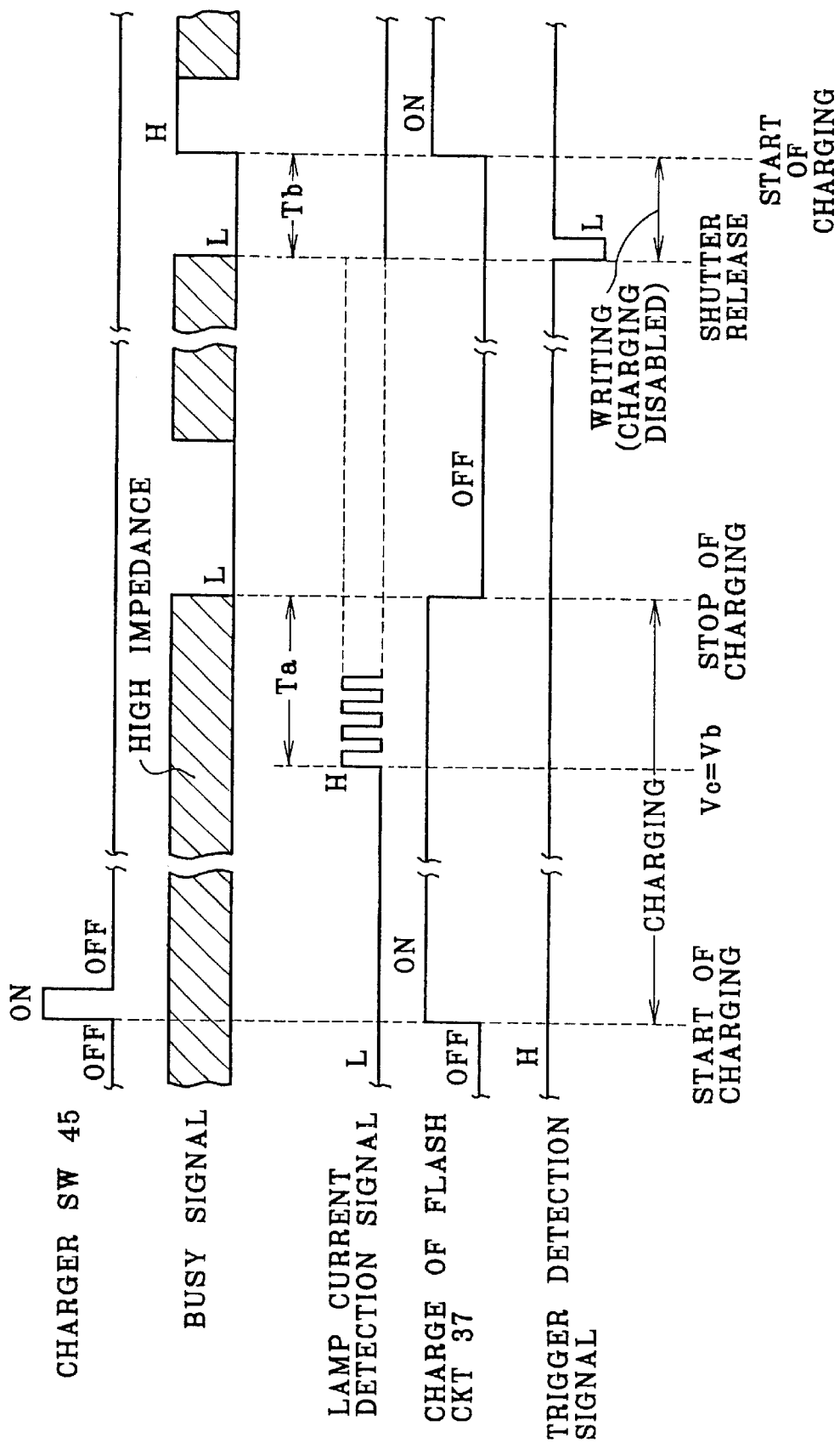
FIG. 10 is a timing chart illustrating operation of the circuits of FIG. 9.

The embodiment to solve this problem is depicted in FIGS. 9 and 10. Elements similar to those of the above embodiments are designated with identical reference numerals. The one end of the neon tube 56 is connected with the negative electrode of the main capacitor 36 via the resistors 64c and 64d. The remaining end of the neon tube 56 is connected with the positive electrode of the battery 43 via a lamp current detector circuit 72 included in a voltage detector. The lamp current detector circuit 72 is included in an information writer device 112, and will be described later in detail.

The lamp current detector circuit 72 includes a lamp current detector transistor 72a which is a p-n-p transistor. The base of the lamp current detector transistor 72a is connected with an electrode of the neon tube 56 via a resistor 64g. The emitter of the lamp current detector transistor 72a is connected with a positive electrode of the battery 43. The collector of the lamp current detector transistor 72a is connected with a negative electrode of the battery 43 via a resistor 64h. A potential of the collector is an output as a LAMP current detection signal.

While the charged voltage Vc of the main capacitor 36 is less than the voltage Vb, the neon tube 56 does not illuminate. There does not occur a base current in the base of the lamp current detector transistor 72a, which is turned off, so the LAMP current detection signal is at the Low (L) level. When the charged voltage Vc of the main capacitor 36 becomes equal to or more than the voltage Vb, the neon tube 56 illuminates. There occurs a base current in the base of the lamp current detector transistor 72a, which is turned on, so the LAMP current detection signal is at the High (H) level. Of course the LAMP current detection signal is at the Low (L) level if the neon tube 56 does not illuminate even when the charged voltage Vc becomes equal to or more than the voltage Vb. Note that the LAMP current detection signal of the High (H) level constitutes a charged voltage detection signal.

Note that circuits for generating a signal of detection of the charged voltage are not limited to the above construction. A detection signal may be generated by use of a change in a potential in the flash circuit in accordance with the charged voltage of the main capacitor 36, or a change in the signal of the flash circuit. For example, a potential of a terminal of the oscillation transformer or a period according to oscillation may be utilized, because both of them are changed according to the charged voltage.

In the lens-fitted photo film unit, the busy terminal 40a of the charge control signal generator 40b of the write control circuit 82 is used instead of a Zener diode being expensive, for the purpose of inhibiting the flash circuit 37 from charging the main capacitor 36. In the operation of the flash circuit 37, the charge control signal generator 40b is set in an inhibit state with the BUSY signal of the Low (L) level. A feedback current is hindered from flowing from the latch transistor 52 to the oscillation transistor 50. The operation of the oscillation transistor 50 is stopped. There is no base current in the base of the latch transistor 52. The latch transistor 52 is turned off, to stop charging the main capacitor 36. Thus the write control IC 40 stops operation of the flash circuit 37 by setting the charge control signal generator 40b in the inhibit state.

The write control circuit 82 changes the BUSY signal to the Low (L) level after the LAMP current detection signal becomes the High (H) level. Immediately upon the change of the LAMP current detection signal to the High (H) level, the main capacitor 36 has not yet had the normal charged voltage Va. This being so, the write control circuit 82 changes the BUSY signal to the Low (L) level upon a lapse of the predetermined time Ta after the change of the LAMP current detection signal to the High (H) level, in order to stop charging the main capacitor 36. The main capacitor 36 is charged to a charged voltage which is substantially constant and equal to or more than the normal charged voltage Va. There is a timer circuit 86 operated by the clock from the oscillator circuit 80. The write control circuit 82 measures elapsed time after the change of the LAMP current detection signal to the High (H) level by use of the timer circuit 86.

The time Ta to elapse before setting the BUSY signal at the Low (L) level is preset equal to or more than time elapsed after a start of illumination of the neon tube 56 and until a reach of the charged voltage Vc across the main capacitor 36 to the normal charged voltage Va. It is desirable that the time Ta should be set so long that the main capacitor 36 can come to have the normal charged voltage Va even when a drop occurs in voltage from the battery 43. In the present lens-fitted photo film unit, the time Ta is set as two (2) seconds. Note that it is possible to cause the neon tube 56 to illuminate in response to a reach of the charged voltage Vc across the main capacitor 36 to the normal charged voltage Va. With such a construction, the BUSY signal can be changed to the Low (L) level immediately after the change of the LAMP current detection signal to the High (H) level.

Thus the operation of the flash circuit 37 is stopped by use of the output from the busy terminal 40a of the charge control signal generator 40b of the write control IC 40. No such costly elements as a Zener diode and stop transistor are required. Although additional generation of the BUSY signal requires a change of the write control IC 40, it is sufficient for the write control IC 40 to have a greater number of elements and have a small partial change. There is no increase or only a small increase in the manufacturing cost of the write control IC 40. It is possible to keep small the manufacturing cost of the lens-fitted photo film unit. There is no need of a manufacturing step of mounting a Zener diode or a stop transistor, or no need of spaces for mounting the same. This construction is effective in reducing the manufacturing cost and the product size.

The operation of the present embodiment is referred to. In FIG. 10, the charged voltage Vc across the main capacitor 36 comes up to the voltage Vb of approximately 265 volts in the course of charging the main capacitor 36. The neon tube 56 comes to be turned on and off repeatedly, to start the blinking operation. Each time that the neon tube 56 is turned on, the lamp current detector transistor 72a is turned on to change the LAMP current detection signal from the Low (L) level to the High (H) level. Upon a first one of the changes of the LAMP current detection signal to the High (H) level, the write control circuit 82 resets and then starts the timer circuit 86.

When it is detected from the value of the timer circuit 86 that two (2) seconds has lapsed after a first change of the LAMP current detection signal to the High (H) signal, then the write control circuit 82 sets the busy terminal 40a of the charge control signal generator 40b to the inhibit state and keeps the BUSY signal at the Low (L) level for a predetermined time in order to stop the flash circuit 37. After this, the busy terminal 40a is set in the high-input-impedance state. While the BUSY signal is the Low (L) level, the negative electrode of the battery 43 is connected with the collector of the latch transistor 52 or with the base of the oscillation transistor 50. No base current flows to the oscillation transistor 50 from the latch transistor 52, to stop the oscillation of the oscillation transistor 50. Also the latch transistor 52 is turned off. As a result the main capacitor 36 stops being charged. In this state, the oscillation transistor 50 does not start oscillation even if the charge control signal generator 40b comes to have the high-input-impedance state.

The main capacitor 36 continues being charged for two (2) seconds after its charged voltage Vc becomes approximately 265 volts. So the main capacitor 36 can be charged to the normal charged voltage Va. After this, the charging operation to the main capacitor 36 is stopped.

If the charger switch 45 is turned on while the neon tube 56 is kept turned off continuously, then the charging is started because the busy terminal 40a of the charge control signal generator 40b has the high-input-impedance state caused by the previous stop of the charging. When two (2) seconds lapse after the start of illumination of the neon tube 56, the charging is stopped. When the charger switch 45 is turned on while the neon tube 56 is blinking, then the charging is started because the charge control signal generator 40b has the high-input-impedance state. But the neon tube 56 has been turned on and off repetitively, to change the LAMP current detection signal between the High (H) level and the Low (L) level alternately. When two (2) seconds lapse after the charger switch 45 is turned on, the charging is stopped. In either of the two manners of the turning on of the charger switch 45, the main capacitor 36 is additionally charged to the normal charged voltage.

The write control circuit 82, while the exposure-taking information is written to EEPROM 21, keeps the BUSY signal at the Low (L) level for a time Tb which begins upon inputting of the trigger detection signal of the Low (L) level and ends upon the finish of the writing of the exposure-taking information. This operation makes it possible correctly to write the exposure-taking information to EEPROM 21. The time Tb is determined for example Tb =50 msec.

When all the exposure-taking information finishes being written to EEPROM 21, charging of the main capacitor 36 starts. The busy terminal 40a of the charge control signal generator 40b is kept at the High (H) level for a predetermined time and then set in the state of the high impedance. When the time Ta or two (2) seconds lapses after turning on of the trigger capacitor 54, the charge control signal generator 40b is changed to the Low (L) level, to stop charging the main capacitor 36.

In the above embodiments, the latch transistor is used for continuing charging the main capacitor only in response to the charging signal generated for one time. Alternatively the latch transistor may be omitted. A slidable charger switch may be used for selectively setting states of being switched on and off. While the slidable charger switch is switched on, the charging signal is sent to the oscillation transistor continuously to charge the main capacitor. Again the BUSY signal can be set in the Low (L) level to stop the charging operation by hindering the charging signal from being supplied to the oscillation transistor.

In the use of the slidable switch, the main capacitor is recharged only by setting the BUSY signal in the high-input-impedance state while the slidable switch remains turned on. If a user desires to recharge the main capacitor after taking an exposure, the BUSY signal is set in the high-input-impedance state, not in the High (H) level. After the charging is stopped, the BUSY signal may be set in the high-input-impedance state each time upon a lapse of a predetermined time, so as to charge the main capacitor additionally by compensating for a decrease of the charged voltage across the main capacitor. Also the BUSY signal may be set at the Low (L) level in the inhibit state for inhibiting the charging operation.

Of course the embodiment having the lamp current detector circuit 72 of FIG. 9 can be used in the construction including the switch 92 connected with the trigger capacitor 54 depicted in FIGS. 6 and 7.

The trigger detector circuit 71 generates a trigger signal which is the trigger detection signal of the Low (L) level. No additional mechanical switch like the trigger switch 35 is used for the purpose of detection of actuation of the shutter mechanism. Consequently the trigger detector circuit 71 makes it possible to save a space for incorporation in the lens-fitted photo film unit, and reduce possibility of breakage.

In the above embodiments, the trigger signal or trigger detection signal from the trigger detector circuit is used for representing the actuation of the shutter. Upon the trigger signal, information is written to the memory IC. Furthermore it is possible to use the trigger detector circuit for the purpose of starting a sequence associated with the actuation of the shutter, for example a sequence in which a light source and a liquid crystal display module is used for photographically imprinting a date of taking an exposure and the like. There is no additional mechanical switch like the trigger switch 35, so that it is possible to save a space for the incorporation, and reduce possibility of breakage.

Figure 11:
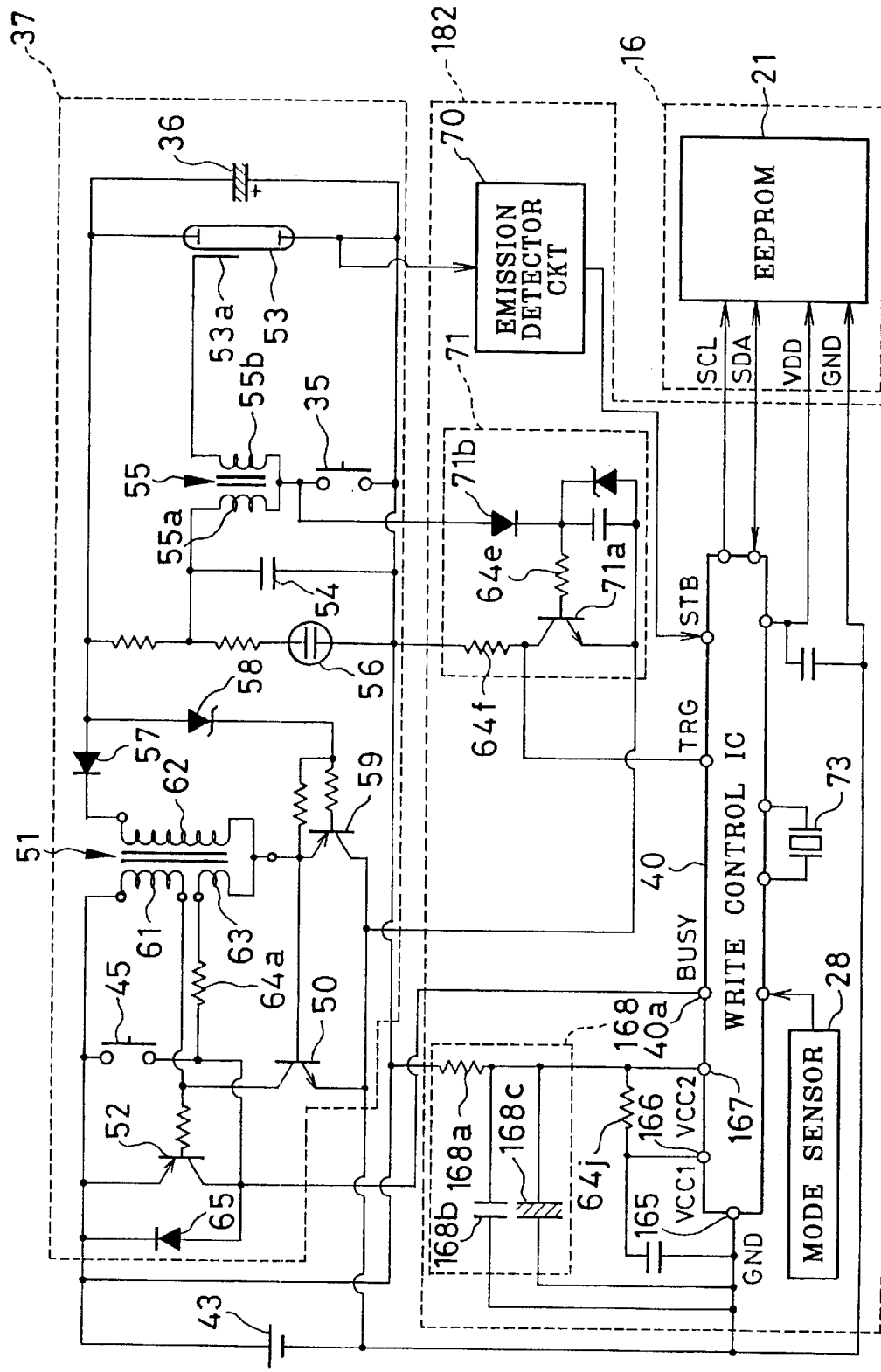
FIG. 11 is a block diagram schematically illustrating further preferred electrical circuits in which a write control IC is protected from influences of electric noises.
Figure 12:
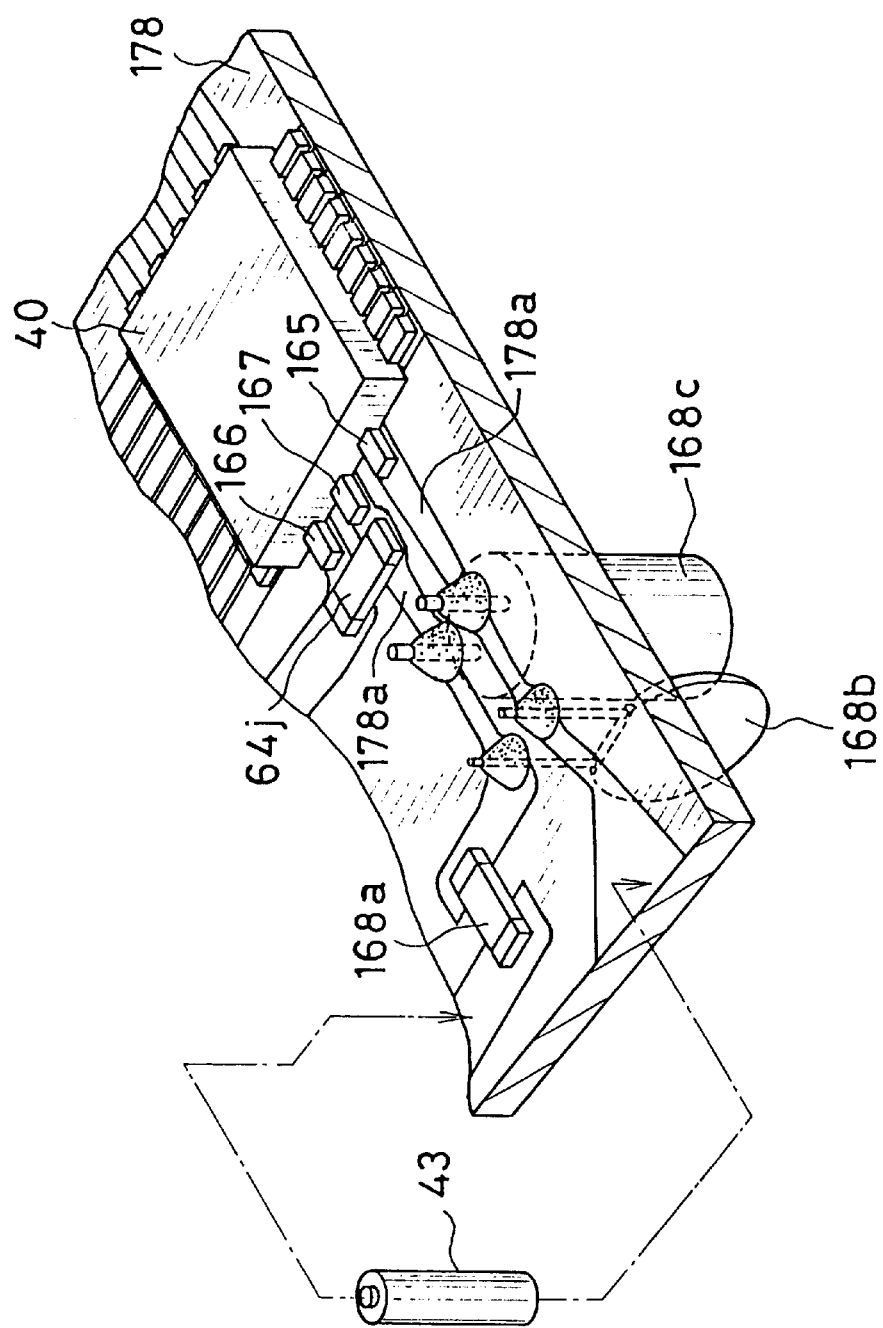
FIG. 12 is a perspective illustrating the write control IC and a filter circuit connected therewith.

Still another preferred embodiment is described now with reference to FIGS. 11–13, in which a write control circuit can be prevented from erroneously operating when the flash is charged or emitted. Elements similar to those of the above embodiments are designated with identical reference numerals. In an information writer device 182 of FIG. 11, a grounded terminal (GND) 165 of the write control IC 40 is connected to a ground-side or negative-side power source line from the battery 43. A VCC1 terminal 166 is connected with a positive-side power source line from the battery 43 with +1.5 volts via the resistor 64j and a resistor 168a. A VCC2 terminal 167 is connected with the same positive-side power source line via the resistor 168a. The resistor 168a constitutes a component included in a filter circuit 168 later to be described. In the present embodiment, the drive voltage VCC1, with which the VCC1 terminal 166 is supplied, is approximately 1.5 volts.

There are a first capacitor 168b and a second capacitor 168c connected between the negative-side and ground-side power source lines through which the write control IC 40 is supplied with voltage V1 of the battery 43. The resistor 168a and the two capacitors 168b and 168c constitute the filter circuit 168, which absorbs electric noises on the power source lines to prevent the write control IC 40 from erroneously operating. Those electric noises include discharging noises caused by discharging the main capacitor 36 to pass the charge through the flash discharge tube 53 for the flash emission, and ripple noises, or fluctuating components of the voltage, caused in the course of charging the main capacitor 36.

The first capacitor 168b has a relatively small capacitance of static charge for absorbing electric noises of high frequency, for example 0.01 $\mu$F. The second capacitor 168c has a greater capacitance of static charge for absorbing electric noises of low frequency, for example 47 $\mu$F.

In FIG. 12, the filter circuit 168 is connected near to the write control IC 40 on a printed circuit board 178. In other words, the filter circuit 168 is connected with the write control IC 40 by use of sufficiently short lines. Patterned lines 178a, namely distances from the filter circuit 168 to the grounded terminal 165 and the VCC1 terminal 166 of the write control IC 40 are determined short. The discharging noises are considerably reduced at the patterned lines 178a, and kept from influencing the operation of the write control IC 40.

The resistor 168a is associated with the positive-side power source line as a portion of the filter circuit 168. The drive voltage VCC1 and the voltage VCC2 supplied for the write control IC 40 drop in accordance with a current flowing through the resistor 168a. However a current flowing on the side of the drive voltage VCC1 is as small as 3 $\mu$A. The drop in the drive voltage VCC1 is extremely small. However a current flowing on the side of the voltage VCC2 for EEPROM 21 is approximately 3 mA when maximized upon writing the information. Writing information for one time requires as small a duration as 10 msec, so that no drop occurs across the two capacitors 168b and 168c. There is no significant drop in the voltage VCC2 in the course of writing information. Moreover the write control IC 40 and EEPROM 21 have sufficiently tolerable ranges of voltage of VCC1 and VDD (VCC2) applicable to them for normal operation. Therefore the write control IC 40 and EEPROM 21 can be operated without fail even in connection of the resistor 168a on the power source line.

When the charging of the main capacitor 36 is started, the voltage V1 of the battery 43 is remarkably dropped. However information inside the write control IC 40 or EEPROM 21 can be stored in a normal state despite the drop in the voltage. Of course the write control IC 40 does not write information to EEPROM 21 while the main capacitor 36 is charged.

In FIG. 4, the write control IC 40 is a single small chip of an integrated circuit, and includes the oscillator circuit 80, the cumulative time measuring circuit 81 for cumulative measurement of time, the write control circuit 82, the parallel/serial (P/S) converter circuit 83 and the voltage doubler circuit 85. Those circuits, except for the voltage doubler circuit 85, are operated with the drive voltage VCC1 input to the VCC1 terminal 166.

The write control circuit 82 has an address counter. Each time that the exposure-taking information finishes being written, what is counted by the address counter is newly stored in an address in EEPROM 21 in place of the previous count, for next exposure-taking information to be written.

The P/S converter circuit 83 is controlled by the write control circuit 82, and converts exposure-taking information into serial data (SDA). The exposure-taking information includes cumulative time information determined upon occurrence of the trigger detection signal, and designation information from the write control circuit 82. The serial data is sent to EEPROM 21 in synchronism with the synchronizing clock (SCL) from the write control circuit 82, to write the exposure-taking information to EEPROM 21. In the course of writing, exposure-taking information is written to an address of EEPROM 21 designated by an address counter of the write control circuit 82.

The operation of the present embodiment is described now. Since the lens-fitted photo film unit is shipped from a factory, the write control IC 40 has been supplied with the drive voltage VCC1 by the battery 43 via the resistor 168a and the resistor 64j, and is in an active state.

Figure 13A:
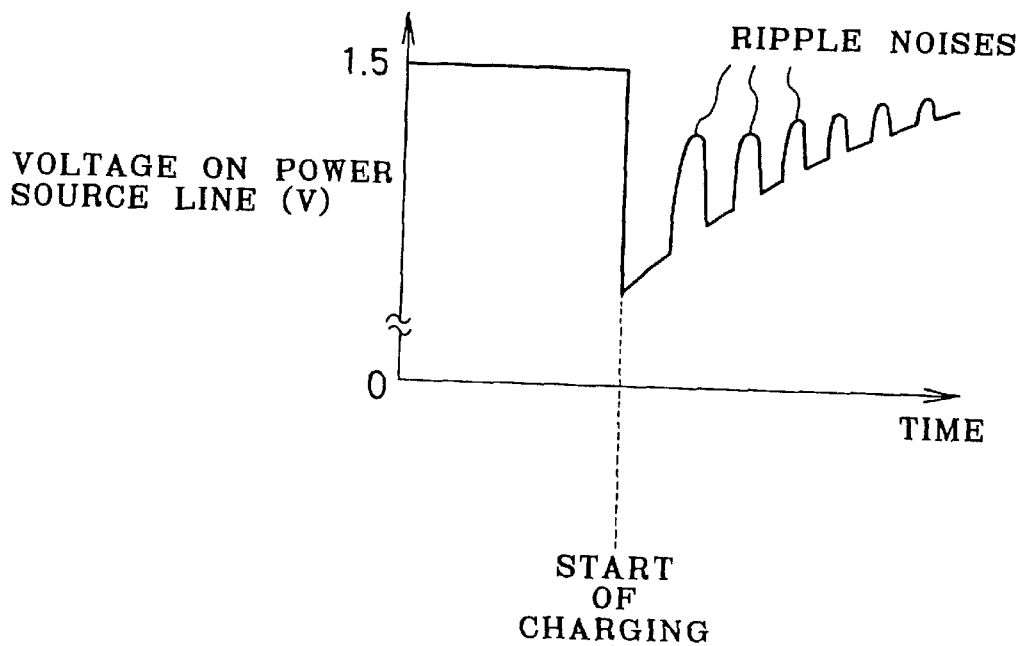
FIGS. 13A and 13B are graphs illustrating changes in the power source voltage with time.

When the main capacitor 36 starts being charged, a great current starts flowing from the battery 43 to the flash circuit 37. As depicted in FIG. 13A, the voltage V1 from the battery 43, or the voltage between the positive-side and ground-side power source lines, conspicuously drops. Afterwards, a current flowing the flash circuit 37 decreases according to an increase in the charged voltage Vc across the main capacitor 36. Therefore the voltage on the power source line increases gradually. There are repeated interruptions in the current from the battery 43 to the flash circuit 37 in synchronism with oscillation of the blocking oscillator circuit. The voltage on the power source line fluctuates like pulses. As a result, ripple noises occur on the power source line. If the write control IC 40 is supplied with the drive voltage VCC1 having the ripple noises from the power source line, components of the write control IC 40 are erroneously operated due to the ripple noises.

When the write control IC 40 is erroneously operated, what is counted by the address counter in the write control circuit 82 is varied by changes in the voltage responsive to the ripple noises. Exposure-taking information is written to an erroneous address upon taking the following exposure. Also cumulative time measured by the cumulative time measuring circuit 81 is varied, so that an incorrect date or time of taking the exposure is likely to be recorded. Furthermore the write control IC 40 is likely to hang up, and come to stop without any further operation.

Figure 13B:
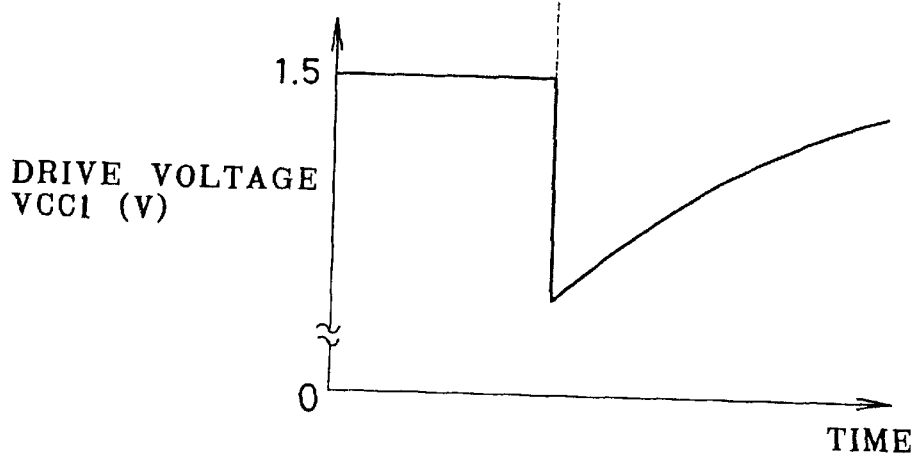

However the filter circuit 168 absorbs and eliminates the ripple noises by use of the resistor 168a and the two capacitors 168b and 168c of FIG. 13B, before the drive voltage VCC1 is input to the VCC1 terminal. Consequently the write control IC 40 does not erroneously operate while the main capacitor 36 is being charged. There is no error in the count of the address counter or the cumulative time. The write control IC 40 does not hang up.

In the course of the flash emission, the main capacitor 36 is discharged to pass the charge through the flash discharge tube 53, to generate discharging noises. The discharging noises are likely to pass through the patterned lines 178a on the printed circuit board 178, or to be radiated as electromagnetic waves in peripheral spaces, so that the discharging noises come to remain on the positive-side and ground-side power source lines connected with the write control IC 40.

In occurrence of the discharging noises on the power source line to vary the drive voltage VCC1, the discharging noise is transmitted to components in the write control IC 40 to cause errors in their operation, in a manner similar to ripple noises. However the filter circuit 168 absorbs and eliminates the discharging noises, which are prevented from being transmitted to the component circuits, or fluctuating the drive voltage VCC1. The write control IC 40 can safely operate normally.

The discharging noises include noise components of various ranges of frequency. As the filter circuit 168 includes the first capacitor 168b with the relatively small capacitance and the second capacitor 168c with the greater capacitance, components of high and low ranges of frequency in the discharging noises are effectively absorbed and eliminated. Moreover the patterned lines 178a from the filter circuit 168 to the grounded terminal 165 and the VCC1 terminal 166 are disposed with a small length for the vicinity of the filter circuit 168 to the write control IC 40. The discharging noises in the form of electromagnetic waves has slight influence even if they exist on the patterned lines 178a. The write control IC 40 can be operated without being influenced by discharging noises generated in the flash emission.

When the write control circuit 82 generates the synchronizing clock, the cumulative time information and designation information is set in synchronism with the synchronizing clock, and converted by the P/S converter circuit 83 into serial data, to be sent to EEPROM 21, as exposure-taking information. The exposure-taking information is written to an address in EEPROM 21 as determined by the address counter in the write control circuit 82. The write control IC 40 is operating normally without influence of ripple noises or discharging noises, so that the address designated for writing the information can be correct in EEPROM 21. The written information can include the correct cumulative time information.

Exposures are similarly taken successively. After each exposure, exposure-taking information is sent and written to EEPROM 21 by the same operation. The write control IC 40 continues normal operation without being affected by ripple noises in charging the main capacitor 36 or by discharging noises during the flash emission. All the exposure-taking information is written to EEPROM 21.

In the above embodiments, the lens-fitted photo film unit is provided with circuits of the present invention. Alternatively a camera may be constructed with circuits of the present invention.

In the above embodiments, the memory IC is EEPROM. Alternatively any suitable memories, such as RAM, may be used in the present invention.

Of course the memory IC or EEPROM may be disposed inside the photo film housing, not inside the photo film cassette, and may be disposed on the outside of the photo film housing.

In the above embodiments, the information is written immediately after taking an exposure. Alternatively the information may be written at the same time as taking an exposure, or while the photo film is wound by one frame after one exposure.

In the above embodiments, the transistors in use are p-n-p or n-p-n types. It is of course possible to change the transistors between the p-n-p and n-p-n types, and their connection of the emitter and collector, in any manner suitable for the purpose of each transistor being connected.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit, including a photo film housing, a photo film roll chamber formed in said photo film housing and pre-loaded with photo film in a roll form, and a cassette holder chamber, formed in said photo film housing, for incorporating a photo film cassette, to wind said photo film therein after being exposed, said photo film housing incorporating a flash-emission main capacitor, a flash discharge tube and a flash circuit, said main capacitor storing charge by a charging operation, said flash discharge tube emitting flash light by a discharging operation of said charge, and said flash circuit controlling said main capacitor and said flash discharge tube for effecting said charging operation and said discharging operation, said lens-fitted photo film unit comprising:

a charged voltage detector circuit for generating a full-charged signal when said main capacitor is charged to a predetermined voltage;

a memory IC incorporated in said photo film housing or said photo film cassette;

a write control IC for writing information to send memory IC, said a write control IC selectively having first, second and third states, said write control IC setting said first state in response to said full-charged signal, for stopping said charging operation, said write control IC setting said second state upon taking of an exposure, to write said information to said memory IC while keeping said charging operation stopped, and said write control IC setting said third state after having said second state, for allowing said charging operation;

wherein the write control IC is constructed to generate an output signal that can be selectively set by the write control IC to any of three electrical conditions, the three electrical conditions corresponding to the first through third states, respectively.

2. A lens-fitted photo film unit as defined in claim 1, wherein said write control IC keeps said second state set for a first predetermined time sufficient for writing of said information.

3. A lens-fitted photo film unit as defined in claim 2, wherein said write control IC sets said first state when a second predetermined time lapses after generation of said full-charged signal.

4. A lens-fitted photo film unit as defined in claim 2, wherein said charged voltage detector circuit includes:

a neon tube for being turned on repeatedly when said main capacitor is charged to said predetermined voltage; and a transistor, turned on when said neon tube is turned on, for generating said full-charged signal.

5. The lens-fitted photo film unit of claim 1, wherein the three electrical conditions are a high voltage level, a low voltage level, and a high impedance state.

6. The lens-fitted photo film unit of claim 5, wherein the first state corresponds to the high impedance condition of the output signal, the second state corresponds to the low voltage state of the output signal, and the third state corresponds to the high voltage condition of the output signal.

7. The lens-fitted photo film unit of claim 6, wherein the flash circuit comprises an oscillation transformer and an oscillation transistor connected to the oscillation transformer, the output signal of the write control IC being connected to the oscillation transistor through the oscillation transformer.

* * * * *